US 11,104,105 B2

(12) United States Patent
Fukushima et al.

(10) Patent No.: US 11,104,105 B2
(45) Date of Patent: Aug. 31, 2021

(54) TIRE, AND METHOD FOR MANUFACTURING TIRE

(71) Applicant: BRIDGESTONE CORPORATION, Tokyo (JP)

(72) Inventors: Atsushi Fukushima, Tokyo (JP); Emil Giza, Tokyo (JP); Hiroyuki Fudemoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 82 days.

(21) Appl. No.: 16/598,304

(22) Filed: Oct. 10, 2019

(65) Prior Publication Data
US 2020/0061979 A1 Feb. 27, 2020

Related U.S. Application Data

(63) Continuation-in-part of application No. PCT/JP2018/011940, filed on Mar. 23, 2018.

(30) Foreign Application Priority Data

Apr. 12, 2017 (JP) .............................. JP2017-079178

(51) Int. Cl.
*B60C 5/01* (2006.01)
*B32B 25/08* (2006.01)
(Continued)

(52) U.S. Cl.
CPC ............... *B32B 25/08* (2013.01); *B32B 7/12* (2013.01); *B60C 1/00* (2013.01); *C09J 119/02* (2013.01);
(Continued)

(58) Field of Classification Search
CPC ....... B32B 25/08; B32B 7/12; B32B 2367/00; B32B 2377/00; B60C 1/00; B60C 5/01; C09J 119/02; C09J 161/06
See application file for complete search history.

(56) References Cited

U.S. PATENT DOCUMENTS 5,998,513 A    12/1999  Hashimoto
2006/0223399 A1* 10/2006  Kurimoto ............... B32B 25/18
                                                                442/164
(Continued)

FOREIGN PATENT DOCUMENTS

EP    3 266 623 A1    1/2018
JP    11-302459 A     11/1999
(Continued)

OTHER PUBLICATIONS

Honma (JP 2016-222051) machine English translation (Year: 2016).*
(Continued)

*Primary Examiner* — Jessica M Roswell
(74) *Attorney, Agent, or Firm* — Sughrue Mion, PLLC

(57) ABSTRACT

A tire having a layered structure includes: a resin member comprising at least one resin selected from the group consisting of a polyamide resin, a polyamide thermoplastic elastomer, a polyester resin, and a polyester thermoplastic elastomer; a resin adhesive layer disposed on the resin member; a rubber adhesive layer that is adhered to a side of the resin adhesive layer and that has a thickness of from 5 μm to 300 μm; and a rubber member disposed on a side of the rubber adhesive layer, wherein the tire is vulcanized, and wherein each of a hardness of the resin member (Ha), a hardness of the resin adhesive layer (Hb), a hardness of the rubber adhesive layer (Hc), and a hardness of the rubber member (Hd) is from 100 MPa to 600 MPa.

20 Claims, 9 Drawing Sheets

(51) Int. Cl.
  *B32B 7/12* (2006.01)
  *B60C 1/00* (2006.01)
  *C09J 119/02* (2006.01)
  *C09J 161/06* (2006.01)
(52) U.S. Cl.
  CPC ......... *C09J 161/06* (2013.01); *B32B 2367/00* (2013.01); *B32B 2377/00* (2013.01)

(56) References Cited

U.S. PATENT DOCUMENTS

| | | | |
|---|---|---|---|
| 2007/0060718 | A1 | 3/2007 | Juhue et al. |
| 2013/0206301 | A1 | 8/2013 | Fudemoto et al. |
| 2015/0136298 | A1* | 5/2015 | Huyghe .................. B32B 27/34 152/537 |
| 2016/0303905 | A1 | 10/2016 | Fudemoto et al. |
| 2018/0050565 | A1* | 2/2018 | Fukushima ............. B29C 65/48 |
| 2018/0086140 | A1 | 3/2018 | Tarutani |
| 2018/0154693 | A1 | 6/2018 | Homma |

FOREIGN PATENT DOCUMENTS

| | | |
|---|---|---|
| JP | 2003-213040 A | 7/2003 |
| JP | 2007-510004 A | 4/2007 |
| JP | 2012-046030 A | 3/2012 |
| JP | 2014-177071 A | 9/2014 |
| JP | 5746938 B2 | 7/2015 |
| JP | 2016-199689 A | 12/2016 |
| JP | 2016-222051 A | 12/2016 |
| JP | 2016222050 A | 12/2016 |
| JP | 2017-032320 A | 2/2017 |
| WO | 2016/143716 A1 | 9/2016 |
| WO | 2016/163425 A1 | 10/2016 |
| WO | 2016/190390 A1 | 12/2016 |
| WO | 2017/002872 A1 | 1/2017 |

OTHER PUBLICATIONS

International Search Report for PCT/JP2018/011940 dated Jun. 26, 2018 [PCT/ISA/210].
Search Report dated Jan. 27, 2021 issued by the China National Intellectual Property Administration in Application No. 2018800244252.
Communication dated Oct. 16, 2020 from the European Patent Office in application No. 18783908.9.

* cited by examiner

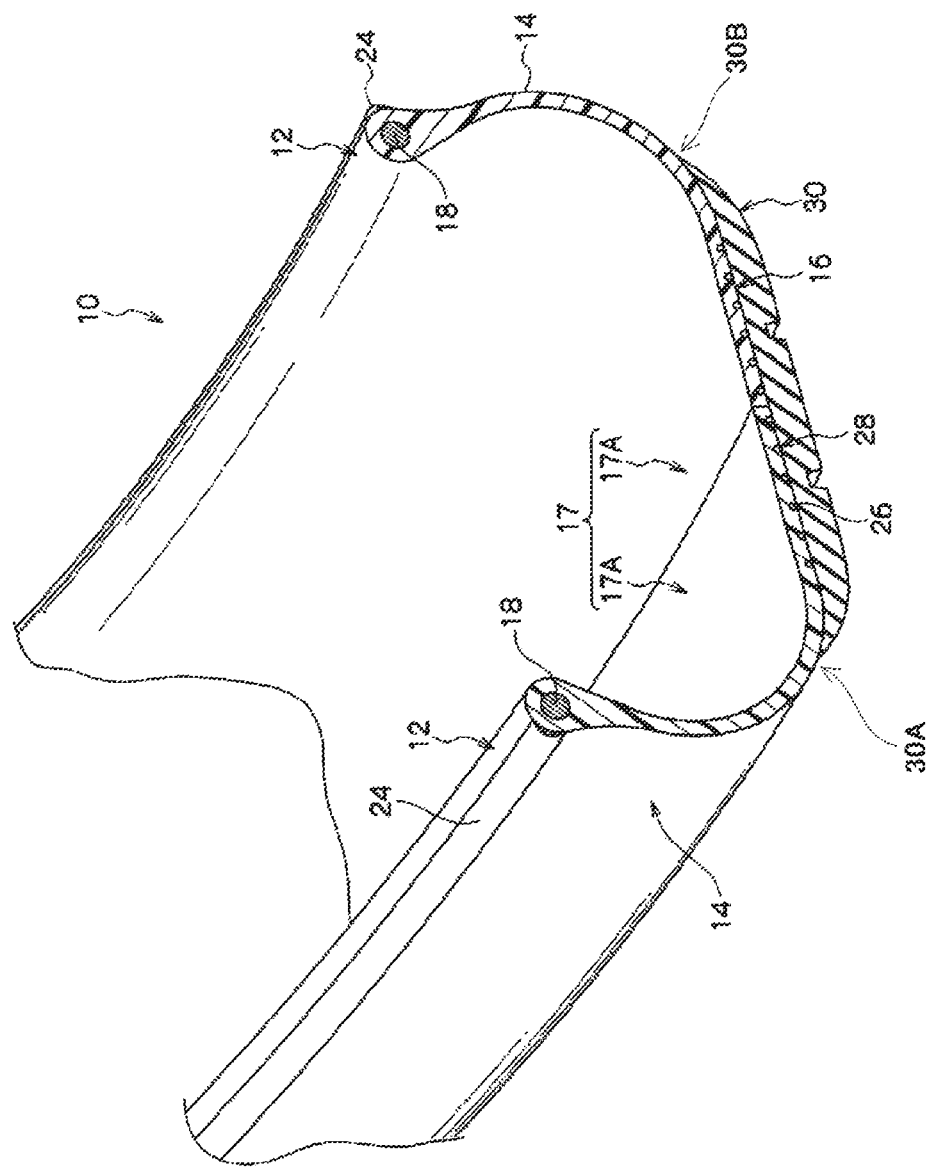

TIRE, AND METHOD FOR MANUFACTURING TIRE

CROSS-REFERENCE TO RELATED APPLICATION

This application is a continuation-in-part application of International Application No. PCT/JP2018/011940, filed Mar. 23, 2018. Further, this application claims priority from Japanese Patent Application No. 2017-079178, filed Apr. 12, 2017.

TECHNICAL FIELD

The present invention relates to a tire and a method of manufacturing the tire.

BACKGROUND ART

Conventional tires are composed of, for example, rubbers, organic fiber materials, steel members, and attempts have been made to improve their heat resistance and the like. On the other hand, tires using materials including thermoplastic resins and thermoplastic elastomers in the tire frame can allow the processes of manufacturing conventional tires, such as molding and vulcanization, to be simpler, thereby leading to improvement of the productivity. In addition, such materials have many advantages over conventional materials, such as weight reduction and recyclability. In particular, the thermoplastic polymer materials are advantageous in productivity because of their possibility for injection molding.

Such tires having a tire frame composed of a resin material as described above includes a tire frame as a resin member, and a rubber member. For example, Japanese Patent Application Laid-Open (JP-A) No. 2012-46030 has disclosed a tire obtained by layering a tire frame that is a resin member, an adhesive, a cushion rubber, a rubber cement, and a tread rubber in this order in order to improve the durability of the tire and the handleability during tire manufacturing.

SUMMARY OF INVENTION

Technical Problem

Durability of rubber tires, including stress resistance and internal pressure resistance, is also required in tires having a tire frame using resin materials.

In order to improve the durability of tires, there have been demands for improvement in the adhesion between a tire frame using a resin material and a rubber member such as tread rubber, and for an appropriate flexibility with respect to external forces. In addition, better workability (manufacturability) compared to conventional tires has also been demanded in tire manufacturing.

Meanwhile, although the tire disclosed in Patent Document 1 uses a rubber cement when a tread rubber is adhered to a resin frame to impart the resin frame with an adhesiveness (tackiness) for easier adhesion with the tread, there is room for improvement in the layered structure constituting the tire and in the flexibility with respect to external forces, that is to say, in the durability of the tire.

In view of the aforementioned circumstances, the present disclosure is intended to provide a tire having high durability and improved manufacturability, and a method of manufacturing the tire.

Solution of Problem

<1> A tire having a layered structure, comprising:
a resin member comprising at least one resin selected from the group consisting of a polyamide resin, a polyamide thermoplastic elastomer, a polyester resin, and a polyester thermoplastic elastomer;
a resin adhesive layer disposed on the resin member;
a rubber adhesive layer that is adhered to a side of the resin adhesive layer that is opposite from a side of the resin adhesive layer on which the resin member is disposed and that has a thickness of from 5 µm to 300 µm; and
a rubber member disposed on a side of the rubber adhesive layer that is opposite from a side of the rubber adhesive layer on which the resin adhesive layer is disposed,
wherein the tire is vulcanized, and
wherein each of a hardness of the resin member (Ha), a hardness of the resin adhesive layer (Hb), a hardness of the rubber adhesive layer (Hc), and a hardness of the rubber member (Hd) is from 100 MPa to 600 MPa.

Advantageous Effects of Invention

According to the present disclosure, a tire having high durability and improved manufacturability, and a method of manufacturing the tire can be provided.

BRIEF DESCRIPTION OF DRAWINGS

FIG. 3A is a perspective sectional view of the tire according to the first embodiment along the tire width direction.

DESCRIPTION OF EMBODIMENTS

Figure 1:
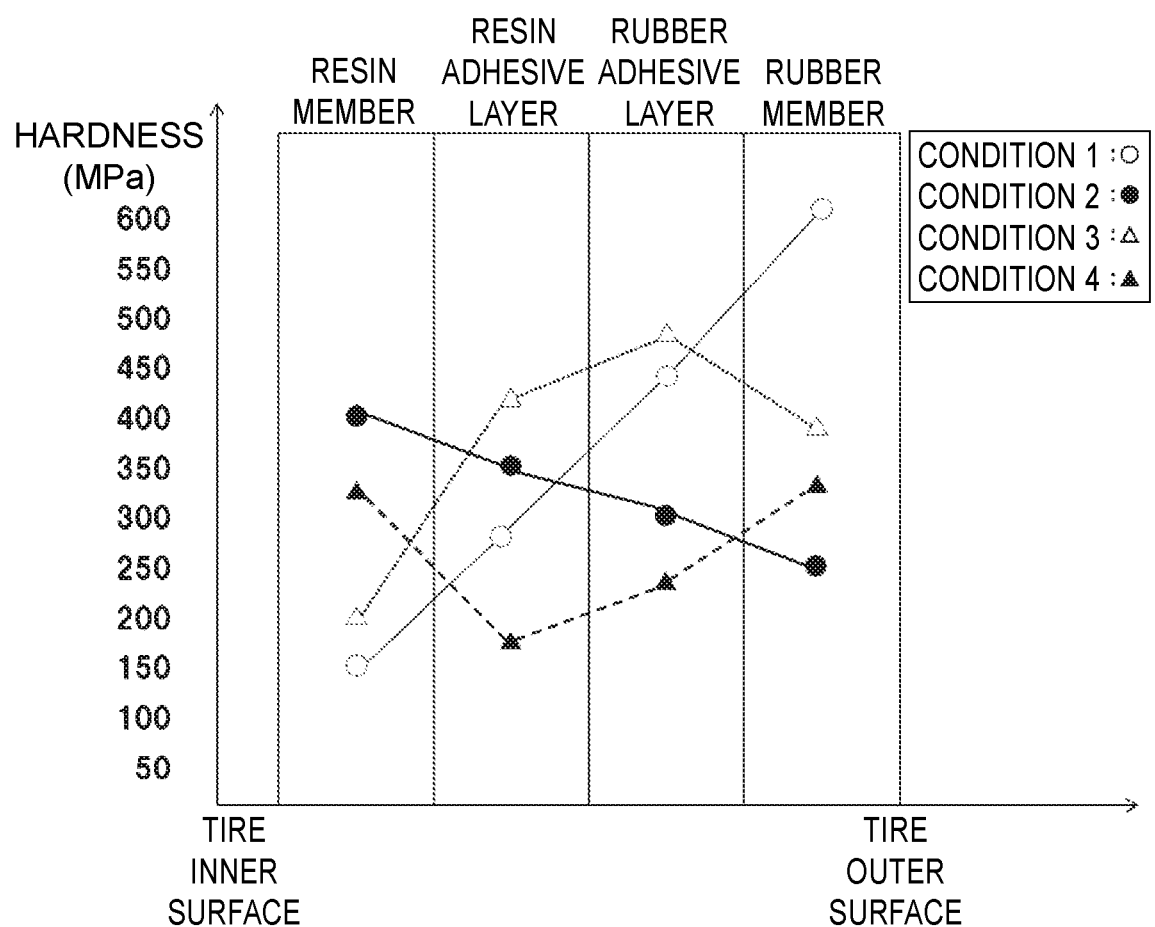
FIG. 1 is a conceptual graph for illustrating a hardness relationship among the members in a common tire.

Specific embodiments of the invention will be described in detail hereinafter. However, it should be noted that the invention is not restricted to the embodiments below but can be carried out with appropriate modification within the scope of the object of the invention.

In the present specification, those numerical ranges that are stated with "to" each denote a range that includes the numerical values stated before and after "to" as the lower and upper limit values, respectively.

The term "step" used herein encompasses not only discrete steps but also those steps which cannot be clearly distinguished from other steps, as long as the intended purpose of the step is achieved.

In the present specification, when reference is made to the amount of a component contained in a composition and there are plural substances corresponding to the component in the composition, the indicated amount of the component means the total amount of the plural substances existing in the composition unless otherwise specified.

The "main component" herein refers to a component having the highest content on a mass basis in a mixture, unless particularly noted.

<Tire>

In one embodiment of the invention, the tire has a layered structure including:
- a resin member comprising at least one resin selected from the group consisting of a polyamide resin, a polyamide thermoplastic elastomer, a polyester resin, and a polyester thermoplastic elastomer;
- a resin adhesive layer disposed on the resin member;
- a rubber adhesive layer that is adhered to a side of the resin adhesive layer that is opposite from a side of the resin adhesive layer on which the resin member is disposed and that has a thickness of from 5 μm to 300 μm; and
- a rubber member disposed on a side of the rubber adhesive layer that is opposite from a side of the rubber adhesive layer on which the resin adhesive layer is disposed,
- wherein the tire is vulcanized, and
- wherein each of a hardness of the resin member (Ha), a hardness of the resin adhesive layer (Hb), a hardness of the rubber adhesive layer (Hc), and a hardness of the rubber member (Hd) is from 100 MPa to 600 MPa.

Thus, the tire has a layered structure including a resin member, a resin adhesive layer, a rubber adhesive layer, and a rubber member in this order.

Collectively, the hardness of the resin member (Ha), the hardness of the resin adhesive layer (Hb), the hardness of the rubber adhesive layer (Hc), and the hardness of the rubber member (Hd) are hereinafter also referred to as simply "hardness".

Since the tire has a layered structure in which the resin member including a specific resin and the rubber member are layered via the dual layers including the adhered resin adhesive and rubber adhesive layers (hereinafter also collectively referred to as intermediate layer), the resin member and the resin adhesive layer of the intermediate layer are strongly adhered, while the rubber adhesive layer of the intermediate layer and the rubber member such as tread are strongly adhered. In other words, the resin adhesive layer can strongly adhere to both the resin member and the rubber adhesive layer, while the rubber adhesive layer can strongly adhere to both the resin adhesive layer and the rubber member, so that the resin member to the rubber member in the layered body are integrated and hard to peeled off.

There is a concern, for a layered body having a layered structure including a resin member, a resin adhesive layer, a rubber adhesive layer, and a rubber member, that when the layered body is deformed by external forces, strains occur between the rubber member and the resin member having different hardness values (for example, between a soft rubber member and a hard resin member) due to the difference in the deformation amounts. Since the strains will be concentrated in the intermediate layer which has the smallest thickness, the intermediate layer is likely to be broken. However, in the tire, the hardness values of the resin member, the resin adhesive layer, the rubber adhesive layer, and the rubber member are all within the range and the thickness of the rubber adhesive layer is within the range, so that the concern described above is unlikely to occur. Hereinafter, description will be made with reference to Figures.

FIG. 1 shows a hardness relationship among a common resin member, resin adhesive layer, rubber adhesive layer, and rubber member. Specifically, the condition 1 shows a case where the resin layer is the softest and the hardness gradually increases in the order of the resin adhesive layer, the rubber adhesive layer, and the rubber layer. The condition 2 shows a case where the resin layer is the hardest and the hardness gradually decreases in the order of the resin adhesive layer, the rubber adhesive layer, and the rubber layer. The conditions 3 and 4 show cases where the hardness relationship does not show a gradual change. When the hardest layer has a hardness of 600 MPa or less and the softest layer has a hardness of 100 MPa or more in the conditions, it is possible to prevent a decrease in the durability due to the balance with the brittleness while maintaining the strength of the entire layer.

In addition, the rubber adhesive layer has a certain thickness that can escape a case where the thickness is too small to maintain the adhesion between the resin member and the rubber member, and that can prevent a case where the thickness is so large that co-crosslinking between the adjacent rubber member and adhesive layer is less likely to form and thereby the adhesion between them is insufficient.

Thus, the destruction of the intermediate layer in the tire by external forces can be inhibited, which will improve the durability of the tire.

Further, the tire employing the rubber adhesive layer can have an improved manufacturability when a rubber member such as tread is layered during tire manufacturing.

Preferably, the hardness of the resin member (Ha), the hardness of the resin adhesive layer (Hb), the hardness of the rubber adhesive layer (Hc), and the hardness of the rubber member (Hd) of the tire satisfy the following Formula 1 or Formula 2:

$$Ha < Hb \leq Hc < Hd, \qquad \text{Formula 1}$$

$$Ha > Hb \geq Hc > Hd. \qquad \text{Formula 2}$$

In other words, like the condition 1 or 2 in FIG. 1, the hardness is preferably gradually increased or decreased in the order of the resin member, the resin adhesive layer, the rubber adhesive layer, and the rubber member.

Formula 1 or Formula 2 can be satisfied to obtain a tire in which strain concentration to the intermediate layer can be further inhibited, thereby having a higher durability.

Preferably, a difference between a largest value and a smallest value among the hardness of the resin member (Ha), the hardness of the resin adhesive layer (Hb), the hardness of the rubber adhesive layer (Hc), and the hardness of the rubber member (Hd) of the tire is small.

For example, like the condition 2 in FIG. 1, when the difference between the hardness of the hardest resin member (Ha) and the hardness of the softest rubber member (Hd) is small, the layered body has small strain due to the difference in deformation amount when it is deformed by external forces, so that the intermediate layer is less likely to be broken, and a tire with high durability with respect to external forces can be obtained.

An exemplary difference between the largest value and the smallest value is 350 MPa or less, preferably 200 MPa or less, more preferably 100 MPa or less from the viewpoint of the durability.

Since the tire has a layered structure in which a resin member, a resin adhesive layer, a rubber adhesive layer, and a rubber member are layered in this order, the tire to be obtained can have high durability and improved manufacturability without cushion rubbers between the members constituting the layered structure. When cushion rubbers are not used between the members, the load is reduced by the weight, and the fuel consumption is improved when a vehicle is equipped with the tire and driven, as compared to the case where the layered structure is formed using cushion rubbers.

As used herein, the terms "hardness (Ha)", "hardness (Hb)", "hardness (Hc)", and "hardness (Hd)" are values measured by nanoindentation on the target members or layers based on a measurement method defined in JIS Z 2255 (2003).

As used herein, the durability of the tire refers to an ability evaluated based on adhesion between the members or layers constituting the tire, and the adequate flexibility toward external forces.

The durability of the tire can be evaluated, for example, by performing a T-peel test according to JIS K6854-3 (1999) on a resin piece constituting the tire.

Alternatively, the durability of the tire can be evaluated, for example, by assembling the tire with a rim in compliance with JATMA, allowing the tire to travel on a drum tester, and then observing how the rubber remains on the tire after the test travel with respect to the tire before the test travel. The traveling on a drum tester means traveling for a certain period of time at a certain speed under conditions of a constant internal pressure and total load.

As used herein, the term "improving the manufacturability" refers to improving the working efficiency during tire manufacturing, for example, a rubber member such as tread being more easily attached to a target to be covered during tire manufacturing.

The ease of attaching a rubber member such as a tread during tire manufacturing is evaluated by appropriate adhesion between the tread and the target to be covered when the tread is attached to the target to be covered. The ease of attaching a tread can be evaluated, for example, based on the interlayer air remaining (i.e., air entrainment) when the tread is attached to a tire case. The air entrainment can be evaluated based on the area of the bubble generated portion (i.e., the portion where air enters the interface and forms a void) per total adhering area at the adhering interface.

Hereinafter, the layered structure of the tire will be described in detail with reference to the drawings, through which the members and layers are also described in detail.

(Exemplified Layered Structure)

FIGS. 2A to 2D show illustrative layered structures in the tire. The layer structures shown in FIGS. 2A to 2D show that the layers are layered in this order and the rubber adhesive layer and the resin adhesive layer are adhered. Thus, the layered structures shown in FIGS. 2A to 2D are all those in which the resin adhesive layer and the rubber adhesive layer are in direct contact.

It is noted that the layer structure of the tire is not restricted only to those shown in FIGS. 2A to 2D.

Figure 2A:
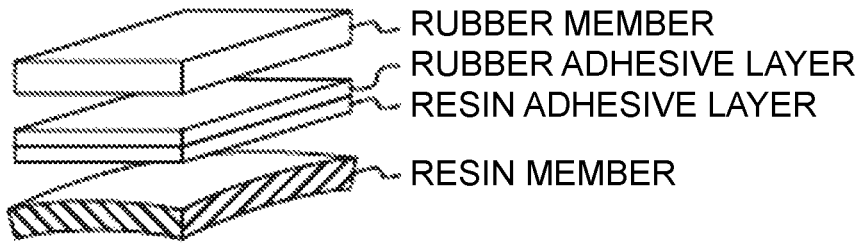
FIG. 2A is a schematic showing a layered structure including a resin member, a resin adhesive layer, a rubber adhesive layer, and a rubber member.

As shown in FIG. 2A, the tire has a layered structure in which a resin adhesive layer, a rubber adhesive layer, and a rubber member are layered on a resin member in this order.

Figure 2B:
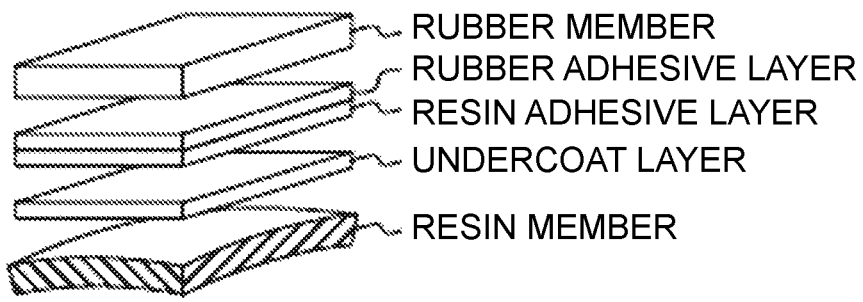
FIG. 2B is a schematic showing a layered structure including a resin member, an undercoat layer, a resin adhesive layer, a rubber adhesive layer, and a rubber member.
Figure 2C:
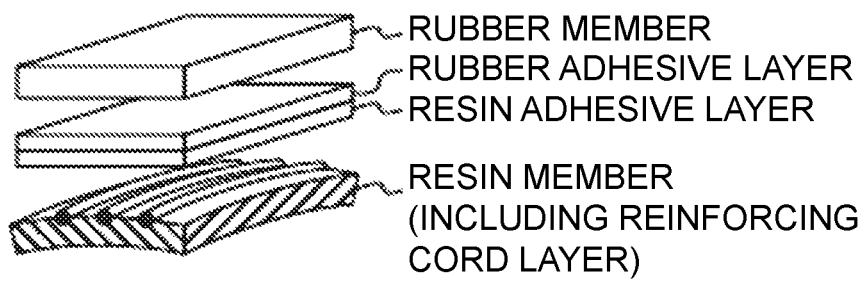
FIG. 2C is a schematic showing a layered structure including a resin member including a reinforcing cord layer, a resin adhesive layer, a rubber adhesive layer, and a rubber member.

As shown in FIG. 2C, the tire may be provided with a reinforcing cord layer on a resin member. The layered structure shown in FIG. 2C has a layered structure in which a resin adhesive layer and a rubber adhesive layer are disposed on the surface on the reinforcing cord layer side of the resin member, and a rubber member is further disposed on the rubber adhesive layer.

Figure 2D:
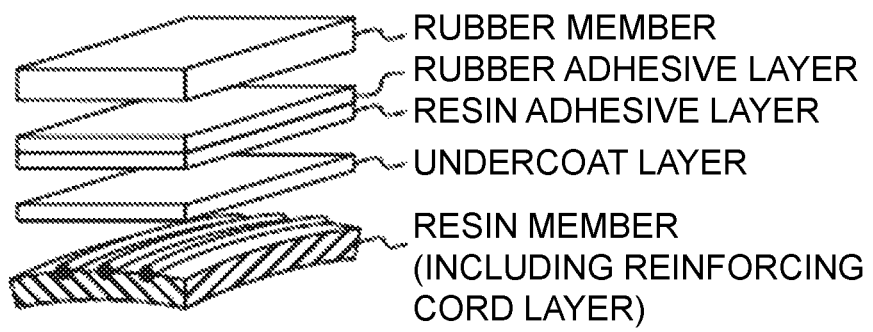
FIG. 2D is a schematic showing a layered structure including a resin member including a reinforcing cord layer, an undercoat layer, a resin adhesive layer, a rubber adhesive layer, and a rubber member.

In addition, the tire, like the layered structure shown in FIG. 2B or 2D, may be provided with an undercoat layer between a resin member and a resin adhesive layer, or between a resin member having a reinforcing cord layer and a resin adhesive layer.

(Rubber Member)

The rubber member is disposed on the rubber adhesive layer, mainly contains a natural rubber or a synthetic rubber, and has a thickness of more than 300 μm (i.e., has a height in the direction vertical to the interface with the rubber adhesive layer of more than 300 μm). The member mainly containing a natural rubber or a synthetic rubber refers to a member containing 50% by mass or more of a natural rubber or a synthetic rubber with respect to the entire member. Hereinafter, the natural rubber or synthetic rubber is also referred to as simply rubber.

The natural rubber and synthetic rubber may be an unvulcanized or vulcanized rubber. Examples of the rubber include, but not limited to, diene rubbers such as natural rubbers (NR), various polybutadiene rubbers (BR), polyisoprene rubbers (IR), styrene-butadiene copolymer rubbers (SBR), and acrylonitrile-butadiene copolymer rubbers (NBR). In addition to the rubber, the rubber member can contain various additives that are commonly added for tires and other rubber compositions, such as carbon black, vulcanizing agents, vulcanization accelerators, various oils, anti-aging agents, and plasticizers. The rubber member can be obtained by kneading together a rubber composition containing them by a general method and vulcanizing it.

The hardness of the rubber member (Hd) can be controlled by adjusting, for example, the components of the rubber member and their mixing ratio. Specifically, for example, the hardness of the rubber member can be decreased by adding a component softer than the rubber (e.g., a resin or an oil softer than the rubber) to the rubber composition. Conversely, the hardness of the rubber member can be increased by adding a component harder than the rubber (e.g., an inorganic filler or a curable resin) to the rubber composition.

The hardness of the rubber member is not particularly limited as long as it satisfies from 100 MPa to 600 MPa. The hardness is preferably 250 MPa or more from the viewpoint of shape maintenance during vulcanization, and is preferably 450 MPa or less from the viewpoint of workability and inhibition of air entrainment.

The shape of the rubber member is not particularly restricted as long as the rubber member contains a rubber. Examples of the rubber member include coating rubber and ply. Examples of the coating rubber include tread and base. As the ply, the rubber member can be used in a predetermined site in appropriate applications as long as it is composed mainly of a rubber.

(Rubber Adhesive Layer)

The rubber adhesive layer mainly contains a rubber, has a hardness of from 100 MPa to 600 MPa, is adhered to the surface of the resin adhesive layer on the side opposite to the resin member side, and has a thickness of from 5 μm to 300 μm. As used herein, the term "mainly containing a rubber" means that 50% by mass or more of a rubber is contained with respect to the entire rubber adhesive layer. The term "thickness of the rubber adhesive layer" refers to the height in the thickness direction of the rubber adhesive layer in a cross section obtained by cutting a layered structure formed by layering a resin member, a resin adhesive layer, a rubber adhesive layer and a rubber member in the thickness direction.

The rubber adhesive layer may be formed by using a rubber adhesive composition mainly containing a rubber.

The rubber adhesive composition used to form the rubber adhesive layer may contain any components without restriction. From the viewpoint of the durability of the tire and the workability during tire manufacturing, the rubber adhesive composition preferably contains a liquid rubber composition. Here, the liquid rubber composition may be called rubber cement. A rubber cement is a composition that contains at least a rubber component and a solvent for dissolving the rubber component, and is used for adhesion between rubber members, or between a rubber member and a member containing a rubber component. Preferably, the rubber adhesive composition contains, for example, an aqueous cement obtained by adding a rubber to an aqueous solvent described in JP-A No. 2011-241363. When the aqueous cement is used, environmental burden can be preferably reduced.

The rubber adhesive composition can also contain chemicals used as additives to a rubber, including reinforcing fillers such as carbon black and silica, vulcanizing agents such as sulfur, vulcanization accelerators and anti-aging agents, as appropriate. Preferably, the content of sulfur is preferably from 0.5 parts by mass to 5 parts by mass with respect to 100 parts by mass of a rubber in the rubber adhesive composition. When the content of sulfur is 0.5 parts by mass or more, co-crosslinking between peripheral rubber member and the rubber adhesive layer can be made, improving the adhesion. Further, when the content of sulfur is 5 parts by mass or less, a sulfur bloom in an interface between the rubber adhesive layer and an adjacent member (i.e., a precipitate formed in the interface) can be reduced, so that a decrease in the interfacial adhesion due to the bloom can be prevented. The content of sulfur is more preferably from 0.5 parts by mass to 3 parts by mass, still more preferably from 1 part by mass to 2.5 parts by mass.

The rubber to be contained in the rubber adhesive composition is not particularly restricted, and is preferably selected as appropriate depending on the materials constituting the rubber member in adjustment of the components. Specifically, for example, when the rubber member contains a butadiene rubber, a rubber adhesive composition containing a butadiene-based splice cement and a butadiene rubber is preferably used. As the rubber adhesive composition, a solventless cement containing a liquid elastomer such as a liquid butadiene rubber, or a cement mainly containing a blend of isoprene rubber (IR) and butadiene rubber (SBR) can also be used. An aqueous cement containing a denatured natural rubber latex for reinforcing the adhesion between rubber members described in, for example, JP-A No. 2011-241363, can be used to reinforce the adhesion between the resin adhesive layer and the rubber member while reducing the environmental burden.

The thickness of the rubber adhesive layer is from 5 μm to 300 μm. When the thickness of the rubber adhesive layer is 5 μm or more, the layer is not too thin and more likely to exhibit sufficient adhesiveness, so that better workability in tire manufacturing can be easily obtained, as compared to the case of 5 μm or less. When the thickness of the rubber adhesive layer is 300 μm or less, the layer is more likely exhibit better toleration to deformation by external forces and thus is unlikely to be broken, as compared to the case of 300 μm or more From the viewpoint of the durability as a tire and the workability during tire manufacturing, the thickness is preferably from 10 μm to 100 μm, more preferably from 10 μm to 50 μm.

The hardness of the rubber adhesive layer is not particularly limited as long as it satisfies from 100 MPa to 600 MPa. From the viewpoint of reduction of breakage inside the rubber adhesive layer, the hardness is preferably 150 MPa or more. From the viewpoint of reduction of cracking of the rubber adhesive layer caused by following a deformation of the subject to be covered (for example, rubber member), the hardness is preferably 400 MPa or less.

The hardness of the rubber adhesive layer (Hc) can be controlled by adjusting, for example, the components of the rubber adhesive composition and their mixing ratio. For example, the hardness of the rubber adhesive layer can be decreased by adding a component softer than the rubber (e.g., a resin or an oil softer than the rubber) to the rubber adhesive composition. Conversely, the hardness of the rubber adhesive layer can be increased by adding a component harder than the rubber (e.g., an inorganic filler or a curable resin) to the rubber adhesive composition.

(Resin Adhesive Layer)

The resin adhesive layer is a layer that is disposed on the resin member and adhered to the rubber adhesive layer.

The resin adhesive layer is formed by using a resin adhesive composition.

The resin adhesive composition for forming the resin adhesive layer is not particularly restricted as long as the resin adhesive layer can be adhered to the rubber adhesive layer and the hardness of the resin adhesive layer can be adjusted into a specific range. Specific examples of the resin adhesive composition include adhesives (hereinafter also referred to as "RFL adhesives") mainly containing a resorcinol-formalin (formaldehyde)-latex (hereinafter also referred to as "RFL"), and well-known solvent dilution-type adhesives. From the viewpoint of the adhesion to both the resin member and the rubber adhesive layer and the heat resistance, the resin adhesive composition is preferably an RFL adhesive. Preferably, the resin adhesive layer contains 60% by mass or more of a rubber with respect to the entire resin adhesive layer. The resin adhesive layer formed with an RFL adhesive may also be referred to as RFL layer.

The term "thickness of the resin adhesive layer" refers to the height in the thickness direction of the resin adhesive layer in a cross section obtained by cutting a layered structure formed by layering a resin member, a resin adhesive layer, a rubber adhesive layer and a rubber member in the thickness direction.

The interfaces between the resin adhesive layer and other layers can be found by observing the section by, for example, SEM-EDX (Energy Dispersive X-ray spectroscopy with a Scanning Electron Microscope).

RFL is a solution of a composition composed of a latex and a resorcinol-formaldehyde condensate obtained by a resol-formation reaction. The resorcinol-formaldehyde condensate is a product obtained by resorcinol-formaldehyde condensing at least one selected from the group consisting of resorcinol and a resorcinol-formaldehyde condensate having a relatively low molecular weight, and formaldehyde by a resol-formation reaction. The adhesive contains a constitutional unit derived from formaldehyde and a constitutional unit derived from resorcinol, and a state in which the constitutional unit derived from formaldehyde is stoichiometrically deficient is maintained, whereby the resorcinol-formaldehyde condensate can be maintained at a low molecular weight and soluble.

Examples of the latex include acrylic rubber latex, acrylonitrile-butadiene rubber latex, isoprene rubber latex, urethane rubber latex, ethylene-propylene rubber latex, butyl rubber latex, chloroprene rubber latex, silicone rubber latex, styrene-butadiene rubber latex, natural rubber latex, vinyl pyridine-styrene-butadiene rubber latex, butadiene rubber latex, butyl rubber latex, carboxylated butadiene-styrene copolymer latex, chlorosulfonated polyethylene latex, and nitrile rubber latex. Among these, vinylpyridine-styrene-butadiene rubber latex is preferably used from the viewpoint of adhesiveness with a rubber adhesive layer. Furthermore, in this case, a copolymer rubber latex having a double structure obtained by two-stage polymerization of vinyl pyridine, styrene, and butadiene is more preferably used. These may be used singly or as a mixture of two or more kinds thereof, or they may be allowed to coexist in a reaction system for reacting resorcinol and formaldehyde before the reaction.

The copolymer rubber latex having double structure obtained by two-stage polymerization of vinyl pyridine, styrene, and butadiene is a copolymer rubber latex of vinyl pyridine, styrene, and butadiene, which can be obtained by (i) polymerizing a monomer mixture of a styrene content of from 10% by mass to 60% by mass, a butadiene content of less than 60% by mass, and a vinyl pyridine content of from 0.5% by mass to 15% by mass, and then, (ii) polymerizing a monomer mixture of a styrene content of from 10% by mass to 40% by mass, a butadiene content of from 45% by mass to 75% by mass, and a vinyl pyridine content of from 5% by mass to 20% by mass with a styrene content lower than the styrene content used in the polymerization in (i).

<Preparation of RFL Adhesive>

The RFL adhesive has a structure in which a latex and a polymer obtained by resol-formation of a resorcinol-formaldehyde condensate are sufficiently entangled three-dimensionally. For this reason, when preparing the RFL adhesive, the resol-formation reaction is carried out in a solution in which the latex is dispersed.

As the solution used in this case, acidic, neutral, or alkaline water, or an organic solvent such as acetone or alcohol may be used. The latex has low water solubility in the region where the pH is neutral, and it is preferable to use alkaline or neutral water in order to sufficiently perform the resorcinol-formaldehyde condensation reaction (resol-formation reaction) in ageing. This resol-formation reaction is usually carried out preferably at pH 8.0 or higher, preferably from at pH 8.5 to 10.0.

Here, the alkaline water refers to a solution in water of sodium hydroxide, lithium hydroxide, potassium hydroxide, ammonium hydroxide, or an organic amine such as monomethylamine or ammonia. A latex can also be dispersed in neutral water by using a ball mill or a sand mill using an arbitrary anionic surfactant. In this case, in order to effectively develop the adhesive force, the amount of the surfactant needs to be reduced to a small amount to such an extent that the dispersed state does not deteriorate.

The molar ratio (F/R) of formaldehyde (F) to resorcinol (R) in the RFL liquid, the ratio (RF/L) of total mass of resorcinol and formaldehyde (RF) to the solids mass (L) of all latex, or the like can be appropriately selected according to the purpose. From the viewpoint of securing a suitable adhesive strength, it is preferable that the molar ratio (F/R) of formaldehyde (F) to resorcinol (R) is in the range of from 1/9 to 6/4.

Examples of a method of reacting the resorcinol-formaldehyde condensate obtained by resol-formation under mixing with a latex include: a method of mixing raw materials of a resorcinol-formaldehyde condensate (i.e., resorcinol, a relatively low molecular weight resorcinol-formaldehyde condensate, and formaldehyde) and a latex in an alkaline solution; and a method in which, at the start of the reaction, a latex is not added, a resol-formation reaction is started with raw materials of a resorcinol-formaldehyde condensate under alkaline liquid condition, and at the earliest possible stage of the reaction, a reaction intermediate of low degree of condensation is mixed with the latex to continue the reaction.

In the resin adhesive layer formed by using the RFL adhesive (also referred to as RFL layer), the content of the latex rubber added to the RFL layer with respect to the entire RFL layer is adjusted as appropriate from the viewpoint of satisfaction of conditions on adhesion with the rubber adhesive layer and hardness of the RFL layer.

The hardness of the resin adhesive layer is not particularly limited as long as it satisfies from 100 MPa to 600 MPa. From the viewpoint of reduction of breakage inside the resin adhesive layer, the hardness is preferably 150 MPa or more. From the viewpoint of reduction of cracking of the resin adhesive layer caused by following a deformation of the subject to be covered (for example, resin member), the hardness is preferably 400 MPa or less.

The hardness of the RFL layer formed by using the RFL adhesive can be controlled by adjusting as appropriate, for example, the types of latex rubber and the like in the RFL adhesive and their mixing ratio. For example, the type of the latex rubber in the RFL adhesive, and the mixing ratio among the latex rubber, resorcinol-formaldehyde, other additives and the like in consideration of the hardness of the rubber member, the rubber adhesive layer, and the resin member can be adjusted as appropriate, and then the method for forming an RFL layer can be used to obtain a resin adhesive layer that satisfies desired conditions.

The thickness of the resin adhesive layer is not particularly limited as long as it does not impair the effects of the present invention, and is preferably from 0.5 μm to 30 μm from the viewpoint of the durability of the tire. The thickness of the resin adhesive layer is more preferably from 1 μm to 10 μm, particularly preferably from 1 μm to 5 μm.

(Method for Adhering Members)

In the layered structure, the resin member, the resin adhesive layer, the rubber adhesive layer, and the rubber member are only required to be layered in this order, and the method of layering the resin member, the resin adhesive layer, the rubber adhesive layer, and the rubber member is not particularly restricted. Preferably, the resin adhesive layer and the rubber adhesive layer are directly adhered from the viewpoint of the durability of the tire. The resin member, the resin adhesive layer, the rubber adhesive layer, and the rubber member may be layered in any order, but preferably, from the viewpoint of the durability of the tire and the workability in tire manufacturing, are adhered in the order of the resin member, the resin adhesive layer, the rubber adhesive layer, and the rubber member.

When the resin member and the rubber adhesive layer are adhered by using an RFL adhesive as a resin adhesive composition for forming a resin adhesive layer, the adhesion can be achieved by, for example, applying the RFL adhesive to the resin member; applying an unvulcanized rubber adhesive composition containing a rubber adhesive composition such as an aqueous cement; depositing an unvulcanized rubber member; and treating the layered body with heat or the like as necessary.

Preferably, a pretreatment on the members before application of the RFL adhesive is selected as necessary and as appropriate. For example, the target surface to be covered with the adhesive can be pretreated before application of the RFL adhesive to reinforce the adhesion. Examples of such a pretreatment method include electron beam, microwave, corona discharge, plasma discharge, and delipidation. The pretreatment can also be made with only buffing or filing.

Here, as a pretreatment, a treatment with an adhesive other than the resorcinol-formalin-latex adhesive (undercoat treatment) may be performed. An undercoat treatment agent used for the undercoat treatment is not particularly limited as long as it is used when a resin member is adhered to a rubber member more sufficiently by an RFL adhesive, and examples thereof include an undercoat composition including a water-soluble polymer containing an epoxy compound and an isocyanate compound described in JP-A No. 2009-191395, an undercoat composition including a copolymer of an alkylated bisphenol and acrylic (methacrylic) acid described in Domestic re-publication of PCT International Publication No. 02-094962, and an undercoat composition containing a vinyl chloride plastisol polymer described in JP-A No. H11-001658. The undercoat treatment agent and the resorcinol-formalin-latex adhesive may be mixed in the course of application.

The layer thickness of the undercoat layer formed by the undercoat treatment agent is preferably from 1 μm to 15 μm.

By setting the surface roughness of the resin member and the like to a certain range, the adhesive strength after adhesion can be further enhanced. As the surface roughness of the resin member, for example, the arithmetic average roughness (Ra) is preferably 0.1 μm or more. In a case in which the surface roughness is 0.1 μm or more, the adhesion area of the resin member (for example, the tire frame and the like) in contact with the resin adhesive layer (for example, the RFL layer) increases, so that more sufficient adhesion can be attained. From the viewpoint of further reducing dripping of the resin adhesive layer (for example, the RFL layer), Ra is preferably 0.5 μm or more, and more preferably 1 μm or more. From the viewpoint of inhibiting cracks in the resin member, Ra is preferably 10 μm or less.

Examples of the method for applying the resin adhesive composition and the rubber adhesive composition include air spraying methods (i.e., atomization methods), dipping methods (i.e., solution methods), roller coating, and methods using a plate brush, a painting brush or the like. Examples of the application methods using an air spray method include air atomization, electrostatic application, and low-pressure air atomization methods. Examples of the solution methods include dip coater, shower coater, and tumbling methods.

When the resin member is adhered, via the RFL adhesive and the rubber adhesive composition, to an unvulcanized rubber member, the layered body is preferably vulcanized. Vulcanization causes formation of cross-links between the rubber in the RFL layer and the rubber in the rubber adhesive layer, and between the rubber adhesive layer and the rubber member, thereby improving the adhesion between members or layers, i.e., the peel resistance.

The vulcanization treatment in this case may be performed by known methods, including those disclosed in JP-A Nos. H11-048264, H11-029658, and 2003-238744. Rubber vulcanization can be achieved by adding, for example, a reinforcing material such as carbon black, a filler, a vulcanizing agent, a vulcanization accelerator, a fatty acid or a salt thereof, a metal oxide, a process oil, and an anti-aging agent as appropriate to the unvulcanized rubber, kneading them together using a Banbury mixer, and then heating the mixture.

(Resin Member)

The resin member contains at least one resin selected from the group consisting of a polyamide resin, a polyamide thermoplastic elastomer, a polyester resin, and a polyester thermoplastic elastomer (hereinafter also referred to as specific resin). The resin member containing the specific resin has a high adhesiveness with the resin adhesive layer (for example, RFL layer), so that the adhesion between the rubber member and the resin member can be enhanced via the rubber adhesive layer.

The resin member may be a member formed by using resin materials containing at least the specific resin. The resin materials are required to contain at least the specific resin, and may contain, for example, a resin other than the specific resins, and/or an additive described later, as necessary.

Preferably, the resin member is a tire frame molded into an annular shape. When the resin member is a tire frame having a bead portion, side portions, and a crown portion, the resin adhesive layer, the rubber adhesive layer, and the rubber member are preferably layered on the crown portion.

The resin member is not restricted to tire frame containing the specific resin, and may be a member other than tire frame, which the member contains the specific resin. The member other than tire frame may be a coated cord member constituting a reinforcing cord layer formed on the outer circumferential surface in the radial direction of the tire frame as described later. The coated cord member is a reinforcing cord member (hereinafter also referred to as simply "reinforcing cord") covered with a coating resin. When the coating resin contain the specific resin, the coated cord member is the resin member. Thus, when a reinforcing cord layer including a coated cord member including a reinforcing cord member and the specific resin is disposed on the outer circumferential surface of the tire frame, the coated cord member may constitute at least a part of the resin member.

When a coated cord member is the resin member (particularly when the coated cord member forms a belt-shaped reinforcing cord layer), the tire frame may be one without the specific resin. Examples of the tire frame without the specific resin include tire frames composed of resin materials containing a resin other than the specific resin, and conventional rubber tire frames. When the tire frame includes a rubber and is provided with a coated cord member on the rubber, the rubber constituting the tire frame, a rubber adhesive layer, a resin adhesive layer, and the coated cord member may be layered in this order to form a layered structure.

The resin member is required to be a member formed from materials containing the specific resin, and may be a single member or multiple members. The single member may be a tire case (i.e., a tire frame) shown in the first embodiment described later. The multiple members may be a combination of a coated cord member and a tire case (i.e., a tire frame) in the second embodiment described later.

When the resin member is a tire frame, and when the tire frame is formed from resin materials containing the specific resin, then a modulus of elasticity as a tire itself and a moldability during manufacture can be obtained.

In addition to the specific resin, the resin member may contain additives such as a filler, a coupling agent, an anti-aging agent, a lubricant, a surface treatment agent, a pigment, an ultraviolet absorber, an antistatic agent, a dispersant, a neutralizer, and an inorganic hollow filler such as glass fiber. These resins and additives can be used singly or in any combination. When a component other than resins, such as an additive, is added to the specific resin, the content of the specific resin in the resin member is preferably 50% by mass or more, more preferably 90% by mass or more with respect to the total amount of the resin member.

The hardness of the resin member in the invention is not particularly limited as long as it satisfies from 100 MPa to 600 MPa. The hardness is preferably 125 MPa or more from the viewpoint of handling and stability, and is preferably 200 MPa or less from the viewpoint of ride comfort (specifically, reduction of longitudinal spring).

The hardness of the resin member can be controlled by adjusting as appropriate the types of and the mixing ratios between the specific resins used for formation of the resin member, other resins, additives used as necessary, and the like.

The resin member is not particularly restricted, and any resin member used in tires may be used. For example, the resin member in the tire in the first embodiment described below is a tire case (i.e., a tire frame), while the resin members in the tire in the second embodiment described below are both a tire case (i.e., a tire frame) and a coating resin constituting a coated cord member. In these embodiments, the resin member may be other members.

[Polyamide Resin]

The polyamide resin contained in the resin member can be selected as appropriate depending on the role of the member. Examples of the polyamide resin include a polyamide obtained by ring-opening polycondensation of epsilon-caprolactam (amide 6), a polyamide obtained by ring-opening polycondensation of undecane lactam (amide 11), a polyamide obtained by ring-opening polycondensation of lauryl lactam (amide 12), a polyamide obtained by polycondensation between diamine and dibasic acid (amide 66), and a polyamide containing meta-xylylenediamine as a constituent unit (amide MX).

Polyamide resins to be used may be commercially available products.

The amide 6 may be a commercially available product, "UBE NYLON" 1022B or 1011FB produced by Ube Industries, Ltd. The amide 12 may be "UBE NYLON" 3024U produced by Ube Industries, Ltd. The amide 66 may be "UBE NYLON 2020B." The amide MX may be a commercially available product, MX NYLON (S6001, S6021, or S6011) produced by Mitsubishi Gas Chemical Company, Inc.

Here, the term "polyamide thermoplastic elastomer" means a thermoplastic elastomer consisting of a copolymer including a polymer which forms a crystalline hard segment having a high melting point and a polymer which forms a non-crystalline soft segment having a low glass transition temperature, in which the polymer which forms a hard segment has an amide bond (—CONH—) in a backbone thereof.

In the thermoplastic elastomer, a portion that connects a hard segment and a soft segment is referred to as "connection portion".

Examples of the polyamide thermoplastic elastomer include a material in which at least a polyamide forms a crystalline hard segment having a high melting point, and another polymer (for example, polyester or polyether) forms a non-crystalline soft segment having a low glass transition temperature.

Hard Segment

Examples of the polyamide that forms the hard segment include a polyamide synthesized by using a monomer represented by the following Formula (1) or Formula (2).

Formula (1)

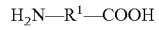

In Formula (1), $R^1$ represents a molecular chain of an aliphatic hydrocarbon having from 2 to 20 carbon atoms. For example, the molecular chain is preferably an alkylene group having from 2 to 20 carbon atoms.

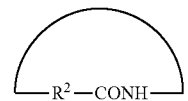

Formula (2)

In Formula (2), $R^2$ represents a molecular chain of an aliphatic hydrocarbon having from 3 to 20 carbon atoms. For example, the molecular chain is preferably an alkylene group having from 3 to 20 carbon atoms.

In Formula (1), $R^1$ is preferably a molecular chain of an aliphatic hydrocarbon having from 3 to 18 carbon atoms (for example, an alkylene group having from 3 to 18 carbon atoms), more preferably a molecular chain of an aliphatic hydrocarbon having from 4 to 15 carbon atoms (for example, an alkylene group having from 4 to 15 carbon atoms), and still more preferably a molecular chain of an aliphatic hydrocarbon having from 10 to 15 carbon atoms (for example, an alkylene group having from 10 to 15 carbon atoms). In Formula (2), $R^2$ is preferably a molecular chain of an aliphatic hydrocarbon having from 3 to 18 carbon atoms (for example, an alkylene group having from 3 to 18 carbon atoms), more preferably a molecular chain of an aliphatic hydrocarbon having from 4 to 15 carbon atoms (for example, an alkylene group having from 4 to 15 carbon atoms), and still more preferably a molecular chain of an aliphatic hydrocarbon having from 10 to 15 carbon atoms (for example, an alkylene group having from 10 to 15 carbon atoms).

Examples of a monomer represented by Formula (1) or Formula (2) include a ω-aminocarboxylic acid and a lactam. Examples of the polyamide forming a hard segment include a polycondensate of a ω-aminocarboxylic acid, a polycondensate of a lactam, and a co-polycondensate of a diamine and a dicarboxylic acid.

Examples of the ω-aminocarboxylic acid include an aliphatic ω-aminocarboxylic acid having from 5 to 20 carbon atoms, such as 6-aminocaproic acid, 7-aminoheptanoic acid, 8-aminooctanoic acid, 10-aminocapric acid, 11-aminoundecanoic acid, or 12-aminododecanoic acid. Examples of the lactam include an aliphatic lactam having from 5 to 20 carbon atoms, such as lauryl lactam, ε-caprolactam, undecanelactam, ω-enantholactam, or 2-pyrrolidone.

Examples of the diamine include diamine compounds including an aliphatic diamine having from 2 to 20 carbon atoms, such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, or 3-methylpentamethylenediamine. The dicarboxylic acid may be represented by HOOC—($R^3$)m-COOH, wherein $R^3$ represents a hydrocarbon molecular chain having from 3 to 20 carbon atoms, and m represents 0 or 1. Examples of the dicarboxylic acid include an aliphatic dicarboxylic acid having from 2 to 22 carbon atoms, such as oxalic acid, succinic acid, glutaric acid, adipic acid, pimelic acid, suberic acid, azelaic acid, sebacic acid, or dodecanedioic acid.

Examples of the polyamide that forms the hard segment include a polyamide (polyamide 6) obtained by ring-opening polycondensation of ε-caprolactam, a polyamide (polyamide 11) obtained by ring-opening polycondensation of undecanelactam, a polyamide (polyamide 12) obtained by ring-opening polycondensation of lauryl lactam, a polyamide (polyamide 12) obtained by polycondensation of 12-aminododecanoic acid, and a polycondensate polyamide (polyamide 66) of a diamine and a dibasic acid.

Polyamide 6 can be expressed by, for example, $\{CO-(CH_2)_5-NH\}_n$, wherein n represents the number of repeating units, which may be freely set. Here, n is preferably from 2 to 100, and more preferably from 3 to 50.

Polyamide 11 can be expressed by, for example, $\{CO-(CH_2)_{10}-NH\}_n$, wherein n represents the number of repeating units, which may be freely set. Here, n is preferably from 2 to 100, and more preferably from 3 to 50.

Polyamide 12 can be expressed by, for example, $\{CO-(CH_2)_{11}-NH\}_n$, wherein n represents the number of repeating units, which may be freely set. Here, n is preferably from 2 to 100, and more preferably from 3 to 50.

Polyamide 66 can be expressed by, for example, $\{CO(CH_2)_4CONH(CH_2)_6NH\}_n$, wherein n represents the number of repeating unit, which may be freely set. Here, n is preferably from 2 to 100, and more preferably from 3 to 50.

The polyamide thermoplastic elastomer preferably includes a polyamide (polyamide 12) having a unit structure represented by $-[CO-(CH_2)_{11}-NH]-$ as a hard segment. As mentioned above, polyamide 12 may be obtained by ring-opening polycondensation of lauryl lactam or polycondensation of 12-aminododecanoic acid.

The number average molecular weight of the polymer (polyamide) that forms the hard segment is preferably from 300 to 15,000 from the viewpoint of the melt molding property.

Soft Segment

Examples of the polymer that forms the soft segment (i.e., a polymer compound that forms the soft segment) includes a polyester and a polyether, such as polyethylene glycol, polypropylene glycol, polytetramethylene ether glycol (PTMG), or an ABA-type triblock polyether. The polymer may be used singly, or in combination of two or more kinds thereof.

The polymer that forms the soft segment may be a polymer having a functional group introduced to a terminal thereof. The functional group may be a group that can react with a terminal group of a compound (e.g., a polymer that forma the hard segment, a chain extender, etc.) that is to be reacted with a polymer that forms the soft segment. For example, in a case in which a terminal group of a compound to be reacted with a polymer that forms the soft segment is a carboxy group, the functional group may be an amino group or the like. For example, in a case in which a terminal group of a compound to be reacted with a polymer that forms the soft segment is an amino group, the functional group may be a carboxy group or the like.

With respect to the polymer that forms the soft segment, examples of a polymer having an amino group introduced to a terminal thereof include a polyether diamine obtained by reacting ammonia or the like with terminals of a polyether. Specific examples thereof include an ABA-type triblock polyether diamine. Meanwhile, with respect the polymer that forms the soft segment, examples of a polymer having a carboxy group introduced to a terminal thereof include a polyether dicarboxylic acid obtained by converting hydroxyl groups at terminals of a polyether into carboxy groups by an oxidation reaction. Specific examples thereof include an ABA-type triblock polyether dicarboxylic acid.

The "ABA-type triblock polyether" may be a polyether represented by the following Formula (3).

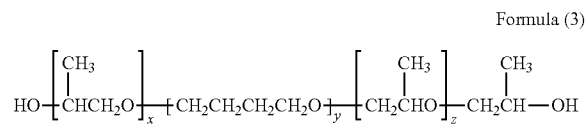

Formula (3)

In Formula (3), each of x and z independently represents an integer of 1 to 20, and y represents an integer of 4 to 50.

In Formula (3), each of x and z is preferably an integer of from 1 to 18, and more preferably an integer of 1 to 16, still more preferably an integer of 1 to 14, and even more preferably an integer of 1 to 12. In Formula (3), y is preferably an integer of 5 to 45, more preferably an integer of 6 to 40, still more preferably an integer 7 to 35, and even more preferably an integer of 8 to 30.

Further, the "ABA-type triblock polyether diamine" may be a polyether diamine represented by the following Formula (N).

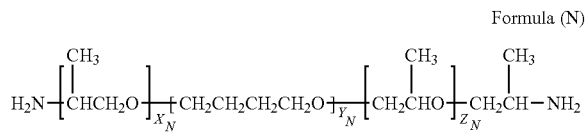

Formula (N)

In Formula (N), each of $X_N$ and $Z_N$ independently represents an integer of 1 to 20, and $Y_N$ represents an integer of 4 to 50.

In Formula (N), each of $X_N$ and $Z_N$ is preferably an integer of 1 to 18, more preferably an integer of 1 to 16, still more preferably an integer of 1 to 14, and even more preferably an integer of 1 to 12. In Formula (N), $Y_N$ is preferably an integer of 5 to 45, more preferably an integer of 6 to 40, still more preferably an integer of 7 to 35, and even more preferably an integer of 8 to 30.

The polymer that forms the soft segment may include as a monomer unit a diamine, such as a branched saturated diamine having from 6 to 22 carbon atoms, a branched alicyclic diamine having from 6 to 16 carbon atoms, or norbornane diamine. A branched saturated diamine having from 6 to 22 carbon atoms, a branched alicyclic diamine having from 6 to 16 carbon atoms, and norbornane diamine may be used singly, or in combination of two or more kinds thereof. These diamines are preferably used in combination with the ABA-type triblock polyether or the ABA-type triblock polyether diamine described above.

Examples of the branched saturated diamine having from 6 to 22 carbon atoms include 2,2,4-trimethyl-1,6-hexanediamine, 2,4,4-trimethyl-1,6-hexanediamine, 1,2-diaminopropane, 1,3-diaminopentane, 2-methyl-1,5-diaminopentane, and 2-methyl-1,8-diaminooctane.

Examples of the branched alicyclic diamine having from 6 to 16 carbon atoms include 5-amino-2,2,4-trimethyl-1-cyclopentanemethylamine and 5-amino-1,3,3-trimethylcyclohexane methyl amine. Each of these diamines may be in the cis-form or the trans-form, or a mixture of these isomers.

Examples of the norbornane diamine include 2,5-norbornane dimethyl amine, 2,6-norbornane dimethyl amine, and a mixture thereof.

The polymer that forms the soft segment may include as a monomer unit an additional diamine compound other than those described above. Examples of additional diamine compound include an aliphatic diamine such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, or 3-methylpentanemethylene diamine; an alicyclic diamine such as bis(4-aminocyclohexyl)methane, bis(4-aminocyclohexyl)propane, 1,3-bis(aminomethyl)cyclohexane, or 1,4-bis(aminomethyl)cyclohexane; and an aromatic diamine such as metaxylylene diamine or paraxylylene diamine.

These diamines may be used singly, or in combination of two or more kinds thereof as appropriate.

However, from the viewpoint of light resistance, the polymer that forms the soft segment preferably contains no aromatic ring.

The weight average molecular weight of the polymer that forms the soft segment is preferably from 200 to 6,000, more preferably from 1,000 to 6,000, and still more preferably from 3,000 to 6,000, from the viewpoint of high toughness and low temperature flexibility.

The combination of the hard segment and the soft segment is, for example, a combination of any of the above examples of the hard segment and any of the above examples of the soft segment. Among these, the combination of a hard segment and a soft segment is preferably a combination of a ring-opening polycondensate of lauryl lactam and polyethylene glycol, a combination of a ring-opening polycondensate of lauryl lactam and polypropylene glycol, a combination of a ring-opening polycondensate of lauryl lactam and polytetramethylene ether glycol, a combination of a ring-opening polycondensate of lauryl lactam and an ABA-type triblock polyether, a combination of a ring-opening polycondensate of lauryl lactam and an ABA-type triblock polyether diamine, a combination of a polycondensate of aminododecanoic acid and polyethylene glycol, a combination of a polycondensate of aminododecanoic acid and polypropylene glycol, a combination of a polycondensate of aminododecanoic acid and polytetramethylene ether glycol, a combination of a polycondensate of aminododecanoic acid and an ABA-type triblock polyether, or a combination of a polycondensate of aminododecanoic acid and an ABA-type triblock polyether diamine; and more preferably a combination of a ring-opening polycondensate of lauryl lactam and an ABA-type triblock polyether, a combination of a ring-opening polycondensate of lauryl lactam and an ABA-type triblock polyether diamine, a combination of a polycondensate of aminododecanoic acid and an ABA-type triblock polyether, or a combination of a polycondensate of aminododecanoic acid and an ABA-type triblock polyether diamine.

Connection Portion

The connection portion of the polyamide thermoplastic elastomer may be, for example, a moiety bound by a chain extender containing an aromatic ring.

Examples of the chain extender containing an aromatic ring include an aromatic dicarboxylic acid and a derivative thereof, an aromatic diamine, an aromatic diol, and an aromatic diisocyanate.

Specific examples of the aromatic dicarboxylic acid include phthalic acid, isophthalic acid, terephthalic acid, phenylenediacetic acid, naphthalenedicarboxylic acid (such as 2,6-naphthalenedicarboxylic acid, 2,7-naphthalenedicarboxylic acid, 1,4-naphthalenedicarboxylic acid, or 2,3-naphthalenedicarboxylic acid), biphenyldicarboxylic acid (such as 4,4-biphenyldicarboxylic acid or 2,2-biphenyldicarboxylic acid), anthracenedicarboxylic acid (such as 2,6-anthracenedicarboxylic acid or 2,7-anthracenedicarboxylic acid), pyrenedicarboxylic acid (such as 4,8-pyrenedicarboxylic acid or 1,6-pyrenedicarboxylic acid), triphenylenedicarboxylic acid (such as 2,7-triphenylenedicarboxylic acid or 1,7-triphenylenedicarboxylic acid), and porphyrin dicarboxylic acid (such as 21H,23H-porphyrin-2,12-dicarboxylic acid.).

Specific examples of the aromatic diamine include o-phenylenediamine, m-phenylenediamine, p-phenylenediamine, m-xylylenediamine, p-xylylenediamine, 1,4-naphthalenediamine, 1,5-naphthalenediamine, 2,6-naphthalenediamine, 2,7-naphthalenediamine, and anthracene-9,10-diacetic acid.

Specific examples of an aromatic diol include o-dihydroxybenzene, m-dihydroxybenzene, p-dihydroxybenzene, 1,4-naphthalenediol, 1,5-naphthalenediol, 2,6-naphthalenediol, 2,7-naphthalenediol, bisphenol A, an ethylene oxide adduct of bisphenol A, a propylene oxide adduct of bisphenol A, and 9,10-dihydroxymethylanthracene.

Specific examples of the aromatic diisocyanate include 1,5-naphthalene diisocyanate, 4,4'-diphenylmethane diisocyanate, 4,4'-diphenyl dimethylmethane diisocyanate, 1,3-phenylene diisocyanate, 1,4-phenylene diisocyanate, 2,4-tolylene diisocyanate, 2,6-tolylene diisocyanate, xylylene diisocyanate, tetramethylxylylene diisocyanate, 2,6-diisopropylphenyl isocyanate, and 1,3,5-triisopropylbenzene-2,4-diisocyanate.

Molecular Weight

The weight average molecular weight of the polyamide thermoplastic elastomer is, for example, from 15,700 to 200,000. In a case in which the weight average molecular weight of the polyamide thermoplastic elastomer is less than 15,700, the fittability to a rim may be reduced. In a case in which the weight average molecular weight of the polyamide thermoplastic elastomer exceeds 200,000, the melt viscosity increases, which may requires increased forming temperature and mold temperature in order to prevent insufficient filling in the production of a tire frame. In this case, the cycle time becomes longer and productivity is decreased.

The weight average molecular weight of the polyamide thermoplastic elastomer is preferably from 20,000 to 160,000. The weight average molecular weight of the polyamide thermoplastic elastomer can be measured by Gel Permeation Chromatography (GPC), using, for example, a GPC (Gel Permeation Chromatography) system such as "HLC-8320 GPC EcoSEC" available from TOSOH CORPORATION. The same applies to the weight average molecular weight of other thermoplastic elastomers as described below.

The mass ratio (HS/SS) of the hard segment (HS) to the soft segment (SS) in the polyamide thermoplastic elastomer is preferably from 30/70 to 90/10 from the viewpoint of molding property, and more preferably from 54/46 to 88/12, and still more preferably from 52/46 to 75/25, from the viewpoint of fittability to a rim and low-loss property.

The content of the hard segment in the polyamide thermoplastic elastomer is preferably from 5% by mass to 95% by mass, more preferably from 10% by mass to 90% by mass, and still more preferably from 15% by mass to 85% by mass, with respect to the total amount of the polyamide thermoplastic elastomer.

The content of the soft segment in the polyamide thermoplastic elastomer is preferably from 5% by mass to 95% by mass, more preferably from 10% by mass to 90% by mass, and still more preferably from 15% by mass to 85% by mass, with respect to the total amount of the polyamide thermoplastic elastomer.

In a case in which the chain extender is used, the content thereof is preferably set so that the terminal groups (such as a hydroxyl group or an amino group) of the polymer that forms the soft segment and the groups (such as a carboxyl group) in the chain extender which are to be bonded to the terminal groups of the soft segment, are substantially equimolar.

The polyamide thermoplastic elastomer may have a connection portion that does not contain an aromatic ring, in addition to the connection portion containing an aromatic ring. The proportion (mass ratio) of a connection portion containing an aromatic ring with respect to the total amount of the connection portions in a polyamide thermoplastic elastomer is, for example, from 1% by mass to 100% by mass, and preferably from 3% by mass to 100% by mass.

Production Method

The polyamide thermoplastic elastomer can be synthesized by polymerizing, by a known method, the polymer that forms the hard segment and the polymer that domes the soft segment, using the chain extender.

For example, the polyamide thermoplastic elastomer may be obtained by polymerizing a monomer which is a constituent of the hard segment (for example, a ω-aminocarboxylic acid such as 12-aminododecanoic acid, and lactam such as lauryl lactam) and a chain extender (such as adipic acid or decanedicarboxylic acid) in a vessel, and then further polymerizing with the addition of a polymer that forms the soft segment (for example, polypropylene glycol, an ABA-type triblock polyether, and diamine derived therefrom by modifying the terminal to an amino group).

In particular, in a case in which a w-aminocarboxylic acid is used as a monomer that forms the hard segment, the synthesis can be done by performing melt-polymerization at ambient pressure, or melt-polymerization at ambient pressure followed by melt-polymerization at reduced pressure. In a case in which lactam is used as a monomer that forms the hard segment, the polymer can be manufactured by a method including melt polymerization under a pressure of from 0.1 MPa to 5 MPa with the coexistence of an appropriate amount of water, followed by melt-polymerization at ambient pressure and/or melt-polymerization at reduced pressure. These synthetic reactions can be performed either in a batch method or in a continuous method. For the above-mentioned synthetic reactions, a batch type reaction tank, a single-tank type or multi-tank type continuous reaction apparatus, a tube-shaped continuous reaction apparatus, or the like may be used singly or in combination thereof as appropriate.

In manufacturing the polyamide thermoplastic elastomer, polymerization temperature is preferably from 150° C. to 300° C., and more preferably from 160° C. to 280° C. Polymerization time may be appropriately determined in view of the relation between the average molecular weight of the polyamide thermoplastic elastomer to be synthesized and the polymerization temperature thereof, and is preferably from 0.5 hours to 30 hours, and more preferably from 0.5 hours to 20 hours.

In manufacturing the polyamide thermoplastic elastomer, a monoamine or diamine such as lauryl amine, stearylamine, hexamethylene diamine, or metaxylylene diamine; or a monocarboxylic acid or dicarboxylic acid such as acetic acid, benzoic acid, stearic acid, adipic acid, sebacic acid, or dodecanedioic acid may be added in order to adjust the molecular weight and stabilize melt viscosity during mold processing, as needed. These compounds may be appropriately selected in consideration of properties such as molecular weight or viscosity of the polyamide thermoplastic elastomer to be obtained as long as these compounds do not adversely affect the advantageous effects of the invention.

In manufacturing the polyamide thermoplastic elastomer, a catalyst may be used, if necessary. Examples of the catalyst include a compound that includes at least one selected from the group consisting of P, Ti, Ge, Zn, Fe, Sn, Mn, Co, Zr, V, Jr, La, Ce, Li, Ca, and Hf.

Examples of the catalyst include inorganic phosphoric compounds, organic titanium compounds, organic zirconium compounds, and organic tin compounds.

Specific examples of the inorganic phosphoric compounds include a phosphor-containing acid such as phosphoric acid, pyrophosphoric acid, polyphosphoric acid, phosphorous acid, or hypophosphorous acid; an alkali metal salt of a phosphor-containing acid; and an alkaline earth metal salt of a phosphor-containing acid.

Examples of the organic titanium compounds include a titanium alkoxide (such as titanium tetrabutoxide, or titanium tetraisopropoxide).

Examples of the organic zirconium compounds include a zirconium alkoxide such as zirconium tetrabutoxide (also referred to as "Zr(OBu)$_4$" or "Zr(OC$_4$H$_8$)$_4$").

Examples of the organic tin compounds include a distannoxane compound (such as 1-hydroxy-3-isothiocyanate-1, 1,3,3-tetrabutyl distannoxane), tin acetate, dibutyl tin dilaurate, and butyltin hydroxide oxide hydrate.

The amount of the catalyst to be added and the timing of the addition thereof are not particularly limited, as long as a target product can be rapidly obtained under such conditions.

Examples of the polyamide thermoplastic elastomer include one in which the hard segment has a polyamide structure, the soft segment has a polyether structure, and the connection portion is a structural unit derived from an aromatic dicarboxylic acid or an aromatic diamine.

The polyamide thermoplastic elastomer is preferably one in which the hard segment is a structural unit derived from a polyamide synthesized using the monomer represented by Formula (1) or Formula (2) described above, the soft segment is a structural unit derived from a polyether having a hydroxyl group or an amino group at a terminal thereof, and the connection portion is a structural unit derived from an aromatic dicarboxylic acid; or one in which the hard segment is a structural unit derived from a polyamide synthesized using the monomer represented by Formula (1) or Formula (2) described above, the soft segment is a structural unit derived from a polyether having a carboxy group at a terminal thereof, and the connection portion is a structural unit derived from an aromatic diamine.

Specifically, preferable examples of the polyamide thermoplastic elastomers include a combination of a ring-opening polycondensate of lauryl lactam, polyethylene glycol, and terephthalic acid; a combination of a ring-opening polycondensate of lauryl lactam, polypropylene glycol, and terephthalic acid; a combination of a ring-opening polycondensate of lauryl lactam, polytetramethylene ether glycol, and terephthalic acid; a combination of a ring-opening polycondensate of lauryl lactam, an ABA-type triblock polyether, and terephthalic acid; a combination of a ring-opening polycondensate of lauryl lactam, an ABA-type triblock polyether diamine, and 2,6-anthracenedicarboxylic acid; a combination of a ring-opening polycondensate of lauryl lactam, polyethylene glycol, and 2,6-anthracenedicarboxylic acid; a combination of a ring-opening polycondensate of lauryl lactam, polypropylene glycol, and 2,6-anthracenedicarboxylic acid; a combination of a ring-opening polycondensate of lauryl lactam, polytetramethylene ether glycol, and 2,6-anthracenedicarboxylic acid; a combination of a ring-opening polycondensate of lauryl lactam, an ABA-type triblock polyether, and 2,6-anthracenedicarboxylic acid; a combination of a ring-opening polycondensate of lauryl lactam, an ABA-type triblock polyether diamine, and 2,6-anthracenedicarboxylic acid; the combination of a polycondensate of aminododecanoic acid, polyethylene glycol, and terephthalic acid; a combination of a polycondensate of aminododecanoic acid, polypropylene glycol, and terephthalic acid; a combination of a polycondensate of aminododecanoic acid, polytetramethylene ether glycol, and terephthalic acid; a combination of a polycondensate of aminododecanoic acid, an ABA-type triblock polyether, and terephthalic acid; a combination of a polycondensate of aminododecanoic acid, an ABA-type triblock polyether diamine, and terephthalic acid; a combination of a polycondensate of aminododecanoic acid, polyethylene glycol, and 2,6-anthracenedicarboxylic acid; a combination of a polycondensate of aminododecanoic acid, polypropylene glycol, and 2,6-anthracenedicarboxylic acid; a combination of a polycondensate of aminododecanoic acid, polytetramethylene ether glycol, and 2,6-anthracenedicarboxylic acid; a combination of a polycondensation product of aminododecanoic acid, an ABA-type triblock polyether, and 2,6-anthracenedicarboxylic acid; and a combination of a polycondensate of aminododecanoic acid, an ABA-type triblock polyether diamine, and 2,6-anthracenedicarboxylic acid. More preferable examples thereof include a combination of a ring-opening polycondensate of lauryl lactam, an ABA-type triblock polyether, and terephthalic acid; a combination of a polycondensate of aminododecanoic acid, an ABA-type triblock polyether, and terephthalic acid; a combination of a polycondensate of aminododecanoic acid, an ABA-type triblock polyether diamine, and 2,6-anthracenedicarboxylic acid; a combination of aminododecanoic acid, polytetramethylene ether glycol, and terephthalic acid; and a combination of a polycondensate of aminododecanoic acid, polytetramethylene ether glycol, and 2,6-anthracenedicarboxylic acid.

As the polyamide thermoplastic elastomer, a combination of preferred aspects described above may be used regarding the combination, the constitutional ratio, the molecular weight, and the like of structural units.

[Polyester Resin]

The polyester resin contained in the resin member can be selected as appropriate depending on the role of the member in the tire. The polyester resin may be crystalline or amorphous, and examples thereof include aliphatic polyesters and aromatic polyesters. The aliphatic polyesters may be saturated aliphatic polyesters or unsaturated aliphatic polyesters.

Examples of the aromatic polyesters include polyethylene terephthalate, polybutyrene terephthalate, polystyrene terephthalate, polyethylene terephthalate, and polybutylene naphthalate. Among them, polybutyrene terephthalate is preferred.

As the aliphatic polyesters, any condensation products of dicarboxylic acid and diol, or of hydroxycarboxylic acid can be used. Examples include polylactic acid, poly-hydroxy-3-butyl butyrate, poly-hydroxy-3-hexyl butyrate, poly(ε-caprolactone), polyenantholactone, polycaprylolactone, polybutylene adipate, and polyethylene adipate.

Examples of the polyester resin also include commercially available products, such as "DURANEX" series (e.g., 2000 and 2002) from Polyplastics Co., Ltd., "NOVADURAN" series (e.g., 5010R5 and 5010R3-2) from Mitsubishi Engineering-Plastics Corporation, and "TORAYCON" series (e.g., 1401X06 and 1401X31) from Toray Industries, Inc.

As a commercially available product of the polyester thermoplastic resin, for example, "DURANEX" Series (e.g., 2000 and 2002) manufactured by Polyplastics Co., Ltd., "NOVADURAN" Series (e.g., 5010R5 and 5010R3-2) manufactured by Mitsubishi Engineering-Plastics Corporation, and "TORAYCON" Series (e.g., 1401X06 and 1401X31) manufactured by Toray Industries, Inc., can be used.

The term "polyester thermoplastic elastomer" refers to an elastic polymer compound, a thermoplastic resin including a copolymer of a crystalline polymer forming a hard segment with a high melting point, and an amorphous polymer forming a soft segment with a low glass transition temperature. The polymer constituting a hard segment can include a polyester resin. Examples of the polyester thermoplastic elastomer include ester thermoplastic elastomers defined in JIS K6418 (2007).

The polyester thermoplastic elastomer may have an amide bond.

Examples of the polyester thermoplastic elastomer include, but not limited to, copolymers of a crystalline polyester forming a hard segment with a high melting point and an amorphous polymer forming a soft segment with a low glass transition temperature.

Examples of the crystalline polyester forming a hard segment include aromatic polyesters. Aromatic polyesters can be produced from, for example, an aromatic dicarboxylic acid or an ester-forming derivative thereof and an aliphatic diol.

Examples of the aromatic polyester forming a hard segment include polyethylene terephthalate, polybutyrene terephthalate, polystyrene terephthalate, polyethylene terephthalate, and polybutylene naphthalate. Among them, polybutyrene terephthalate is preferred.

One of the aromatic polyester is preferably a polybutylene terephthalate derived from 1,4-butanediol and at least one selected from the group consisting of terephthalic acid and dimethyl terephthalate. Alternatively, the aromatic polyester may be, for example, a polyester derived from a dicarboxylic acid component (e.g., isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative of these dicarboxylic acids) and a diol having a molecular weight of 300 or less (e.g., an aliphatic diol, such as ethylene glycol, trimethylene glycol, pentamethylene glycol, hexamethylene glycol, neopentyl glycol, or decamethylene glycol; an alicyclic diol, such as 1,4-cyclohexane dimethanol or tricyclodecane dimethylol; and an aromatic diol, such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl] cyclohexane, 4,4'-dihydroxy-p-terphenyl, or 4,4'-dihydroxy-p-quaterphenyl), or a copolyester obtained by using two or more of the above-described dicarboxylic acid components and diol components. It is also possible to copolymerize, for example, a polyfunctional carboxylic acid component, a polyfunctional oxyacid component or a polyfunctional hydroxy component, which has three or more functional groups, in a range of 5% by mole or less.

Examples of the polymer forming the soft segment include, an aliphatic polyester and an aliphatic polyether.

Examples of the aliphatic polyether include poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide addition polymer of poly(propylene oxide) glycol, and a copolymer of ethylene oxide and tetrahydrofuran.

Examples of the aliphatic polyester include poly(c-caprolactone), polyenantholactone, polycaprylolactone, poly(butylene adipate), and poly(ethylene adipate).

Among the aliphatic polyethers and the aliphatic polyesters, as the polymer forming the soft segment, poly(tetramethylene oxide) glycol, an ethylene oxide addition product of poly(propylene oxide) glycol, poly(c-caprolactone), poly(butylene adipate), and poly(ethylene adipate), and the like are preferable from a viewpoint of the elasticity characteristic of an obtained polyester block copolymer.

Preferably, the number average molecular weight of the polymer (polyester) forming a hard segment is from 300 to 6,000 from the viewpoint of toughness and low-temperature flexibility. Preferably, the number average molecular weight of the polymer forming a soft segment is from 300 to 6,000 from the viewpoint of toughness and low-temperature flexibility. The mass ratio (x:y) of the hard segment (x) and the soft segment (y) is preferably from 99:1 to 20:80, more preferably from 98:2 to 30:70 from the viewpoint of moldability.

The polyester thermoplastic elastomer can be synthesized by copolymerizing the polymer for forming the hard segment and the polymer for forming the soft segment by a publicly known method.

As a commercial product for the polyester thermoplastic elastomer, for example, "HYTREL" series (for example, 3046, 5557, 6347, 4047, and 4767) from Du Pont-Toray Co., Ltd., and "PELPRENE" series (for example, P30B, P40B, P40H, P55B, P70B, P150B, P280B, P450B, P150M, S1001, S2001, S5001, S6001, and S9001) produced by Toyobo Co., Ltd. may be used.

When a combination of a polyamide thermoplastic elastomer and a polyester thermoplastic elastomer is used as the resin, the mass ratio (x:y) between the polyamide thermoplastic elastomer (x) and the polyester thermoplastic elastomer (y) is preferably from 95:5 to 50:50. When the mass ratio between the elastomers is from 95:5 to 50:50, the combination of the polyamide thermoplastic elastomer and the polyester thermoplastic elastomer can keep the characteristics of the polyamide thermoplastic elastomer while being imparted with the characteristics of the polyester thermoplastic elastomer. This enables easy control of the modulus of elasticity of the tire while maintaining the welding properties between the reinforcing cord member and the tire frame via the polyamide thermoplastic elastomer, resulting in a tire that has a further improved tire durability and is less likely to deform due to temperature change. More preferably, the mass ratio (x:y) between the polyamide thermoplastic elastomer (x) and the polyester thermoplastic elastomer (y) is from 90:10 to 50:50.

The resin member may contain as necessary, for example, resins other than those described above (including thermoplastic elastomers), rubbers, various fillers (e.g., silica, calcium carbonate, and clay), anti-aging agents, oils, plasticizers, colorants, weathering agents, and reinforcing materials as various additives. The total content of the additives in the entire resin member is not particularly limited, and can be suitably used without impairing the effects of the invention.

(Reinforcing Cord Layer)

The tire may have a reinforcing cord layer on the outer circumferential surface in the radial direction of the tire frame. The reinforcing cord layer includes at least a reinforcing cord member, and may consist of the reinforcing cord member or, as described above, include a coated cord member that is the reinforcing cord member coated with a coating resin. Preferably, the reinforcing cord member is coated with a coating resin containing the specific resin described above. Among coating resins containing the specific resin, coating resins containing a polyamide thermoplastic resin are preferable, and coating resins containing a polyamide thermoplastic elastomer (TPA) defined in JIS K 6418 (2007) are particularly preferable.

When the reinforcing cord layer contains the specific resin as described above, the adhesion property between the coated cord member forming a reinforcing cord layer and the rubber adhesive layer via an RFL may increase. Particularly when the tire frame contains the specific resin and when the reinforcing cord layer contain the specific resin, then the difference in the hardness between the tire frame and the reinforcing cord layer can be decreased, so that the reinforcing cord member can be closely fixed with the tire frame, as compared with the case where the reinforcing cord is fixed with a cushion rubber.

Further, in a case in which the reinforcing cord is a steel cord, and in which an attempt is made to separate the reinforcing cord from the cushion rubber at the time of disposal of the tire, vulcanized rubbers are difficult to separate from the reinforcing cord only by heating. In contrast, in the case of a polyamide thermoplastic resin, the reinforcing cord can be separated only by heating. For this reason, there is an advantage in terms of recyclability of the tire in a case of a polyamide thermoplastic resin. A polyamide thermoplastic resin usually have a loss factor (Tan δ) lower than that of vulcanized rubbers. Accordingly, when the reinforcing cord layer contains a large amount of a resin, the rolling properties of the tire can be improved. Further, a polyamide thermoplastic resin having a relatively high elastic modulus as compared with vulcanized rubbers are advantageous in that the polyamide thermoplastic resin have high in-plane shear stiffness, and also provide excellent steering stability and excellent abrasion resistance at the time of traveling with the tire.

In a case in which the tire frame is formed from a resin material, the elastic modulus (the tensile modulus of elasticity as defined in JIS K7113: 1995) of the coating resin used in the reinforcing cord layer is preferably set within a range of from 0.1 times to 10 times the elastic modulus of the resin material. In a case in which the elastic modulus of the coating resin is not more than 10 times the elastic modulus of the resin material forming the tire frame, the crown portion does not become too hard, facilitating the rim assembling property. In a case in which the elastic modulus of the coating resin is 0.1 times or more the elastic modulus of the resin material forming the tire frame, a resin constituting the reinforcing cord layer is not too soft, the in-plane shear stiffness of the belt is high, and cornering power is improved.

In a case in which a coating resin is included in the reinforcing cord layer, from the viewpoint of increasing pull-out property of a reinforcing cord (i.e., difficulty to pull out), the surface of the reinforcing cord member is preferably coated with a coating resin by 20% or more, and more preferably, the surface is coated by 50% or more. The content of the coating resin in the reinforcing cord layer is preferably 20% by mass or more, and more preferably 50% by mass or more, from the viewpoint of enhancing the extractability of the reinforcing cord with respect to the total amount of the materials constituting the reinforcing cord layer excluding the reinforcing cord.

When the tire frame is formed from resin materials containing the specific resin, and when the reinforcing cord member is not coated with a coating resin, for example, at least a portion of the reinforcing cord member may be embedded in the outer circumference of the tire frame in a cross-section view along the axial direction of the tire frame. In this case, the reinforcing cord layer consists of the reinforcing cord member.

On the other hand, when tire frame is formed from a resin material, and when the reinforcing cord member is coated with a coating resin, a resin material that is the same kind as or different kind from the resin material forming the tire frame may be the coating resin for the reinforcing cord. Preferably, the same kind of resin material is the coating resin. The same kind of resin materials means a case in which they are, for example, both amide resin materials, both urethane resin materials, or both styrene resin materials.

First Embodiment

The tire according to the first embodiment will be described below with reference to the drawings. In the first embodiment, the tire case is a resin member, and a reinforcing cord member not coated with a coating resin is partially embedded in the outer circumferential surface in the radial direction of the tire case.

Figure 3B:
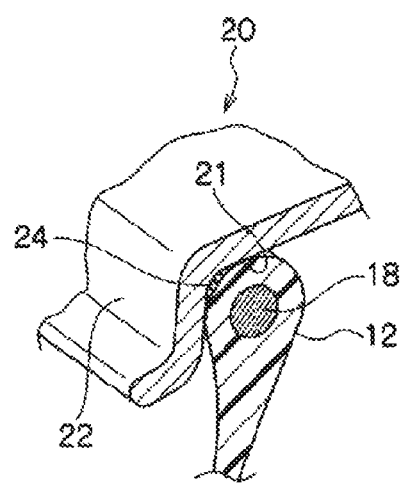
FIG. 3B is an enlarged sectional view of the bead portion of the tire according to the first embodiment fitted to a rim, along the tire width direction.

A tire 10 of the first embodiment will be described. FIG. 3A is a perspective sectional view of a portion of the tire according to one embodiment. FIG. 3B is a sectional view of a bead portion fitted to a rim. As shown in FIG. 3A, the tire 10 has a substantially the same cross-sectional shape as those of conventional common rubber pneumatic tires.

As shown in FIG. 3A, the tire 10 include a tire case 17 including a pair of bead portions 12 to be each contacted with a bead sheet 21 and a rim flange 22 of a rim 20 as shown in FIG. 3B; side portions 14 extending from the bead portion 12 outward in the radial direction of the tire; and a crown portion 16 (outer circumference) connecting the outer end in the tire radial direction of one of the side portions 14 and the outer end in the tire radial direction of the other of the side portions 14. An intermediate layer (a resin adhesive layer and a rubber adhesive layer) located between the crown portion 16 (outer circumference) and the tread 30 which is a rubber member as shown in FIG. 3A is formed in a range from 30A to 30B along the circumference of the crown portion 16. In the first embodiment, the layered structure corresponds to the layer structure shown in FIG. 2A. When a rubber member is further disposed on the outer circumference of the side portion 14, an intermediate layer may be formed between the rubber member and the side portion 14. The thickness of the intermediate layer may vary depending on the site. For example, the thickness may be thick at the site where a reinforcing cord 26 exists, or may be thin at the site near the side portion 14 or the like.

The tire case 17 (resin member) in the first embodiment is formed from a single resin, i.e., a polyamide thermoplastic elastomer (UBESTA XPA 9055 produced by Ube Industries, Ltd.). However, the invention is not restricted to this component, and may employ thermoplastic resins having different characteristics for each portion of the tire case 17 (the side portion 14, the crown portion 16, the bead portion 12 and the like) as long as the thermoplastic resins are materials containing the specific resin, similar to conventional common rubber pneumatic tires. Further, a reinforcing material (for example, a polymer or metal fiber, cord, nonwoven fabric, or woven fabric) may be embedded in the tire case 17 (for example, in the bead portion 12, the side portion 14, or the crown portion 16) to reinforce the tire case 17 with the reinforcing material.

The tire case 17 according to the first embodiment is a member obtained by joining together a pair of tire case half parts (tire case pieces) 17A formed of a resin material. Each tire case half part 17A is formed by producing an integrated body composed of one bead portion 12, one side portion 14, and a half-width part of the crown portion 16 by molding such as injection molding. The tire case 17 is formed by disposing the formed tire case half parts 17A, which have the same annular shape, to face to each other, and joining them together at the tire equatorial plane. The tire case 17 is not limited to those obtained by joining together two members, and may be formed by joining together three or more members.

Each of the tire case half parts 17A formed using the above-described resin material may be shaped by, for example, vacuum molding, pressure forming, injection molding, or melt casting. Therefore, vulcanization is unnecessary, the production process can greatly be simplified, and the forming time can be saved, as compared to the case of forming a tire case with rubber as in conventional techniques.

In the first embodiment, the tire case half parts 17A have a bilaterally symmetric shape, i.e., one of the tire case half parts 17A has the same shape as the other tire case half part 17A. Therefore, there is also an advantage in that only one type of mold is required for shaping the tire case half parts 17A.

In the first embodiment, an annular bead core 18 made of a steel cord similar to those used in conventional ordinary pneumatic tires is embedded in each of the bead portions 12, as illustrated in FIG. 3B. However, the invention is not limited to this configuration, and the bead core 18 may be omitted as long as it is ensured that the bead portions 12 have rigidity, and mounting on the rim 20 can be performed successfully. The bead core 18 may alternatively be formed using, for example, an organic fiber cord, a resin-coated organic fiber cord, or a hard resin, instead of a steel cord.

In the first embodiment, an annular sealing layer 24 formed of a material (for example, rubber) having a higher sealing property than that of the resin material for forming the tire case 17 is provided on a part of the bead portions 12 that contacts the rim 20 or at least on a part of the bead portions 12 that contacts the rim flange 22 of the rim 20. The sealing layer 24 may also be provided in a part in which the tire case 17 (the bead portions 12) and the bead seat 21 contact each other. As the material having a higher sealing property than that of the resin material for forming the tire case 17A, a material softer than the resin material for forming the tire case 17 may be used. As rubbers usable for the sealing layer 24, the same types of rubbers as the rubbers used on the outer surfaces of the bead portions of conventional ordinary pneumatic rubber tires are preferably used. Another thermoplastic resin (thermoplastic elastomer) having a higher sealing property than that of the resin material may be used. Examples of another thermoplastic resin include a polyurethane resin, a polyolefin resin, a polystyrene thermoplastic resin, or a polyester resin, or a blend of any of these resins with a rubber or an elastomer. It is also possible to use a thermoplastic elastomer, such as a polyester thermoplastic elastomer, a polyurethane thermoplastic elastomer, a polystyrene thermoplastic elastomer, a polyolefin thermoplastic elastomer, or a combination of two or more of these elastomers or a blend of any of these elastomers with a rubber.

As illustrated in FIG. 3A, the reinforcing cord 26 having a higher rigidity than that of the polyamide thermoplastic elastomer for forming the tire case 17 is wound around the crown portion 16 in the circumferential direction of the tire case 17. The reinforcing cord 26 is helically wound to form a reinforcing cord layer 28 in a state in which at least a part of the reinforcing cord 26 is embedded in the crown portion 16 in cross-sectional view taken along the axial direction of tire case 17. The tread 30 formed of a material (for example, rubber member) having a higher abrasion resistance than that of the polyamide thermoplastic elastomer for forming the tire case 17 is disposed at the tire-radial-direction outer circumferential side of the reinforcing cord layer 28.

Figure 4:
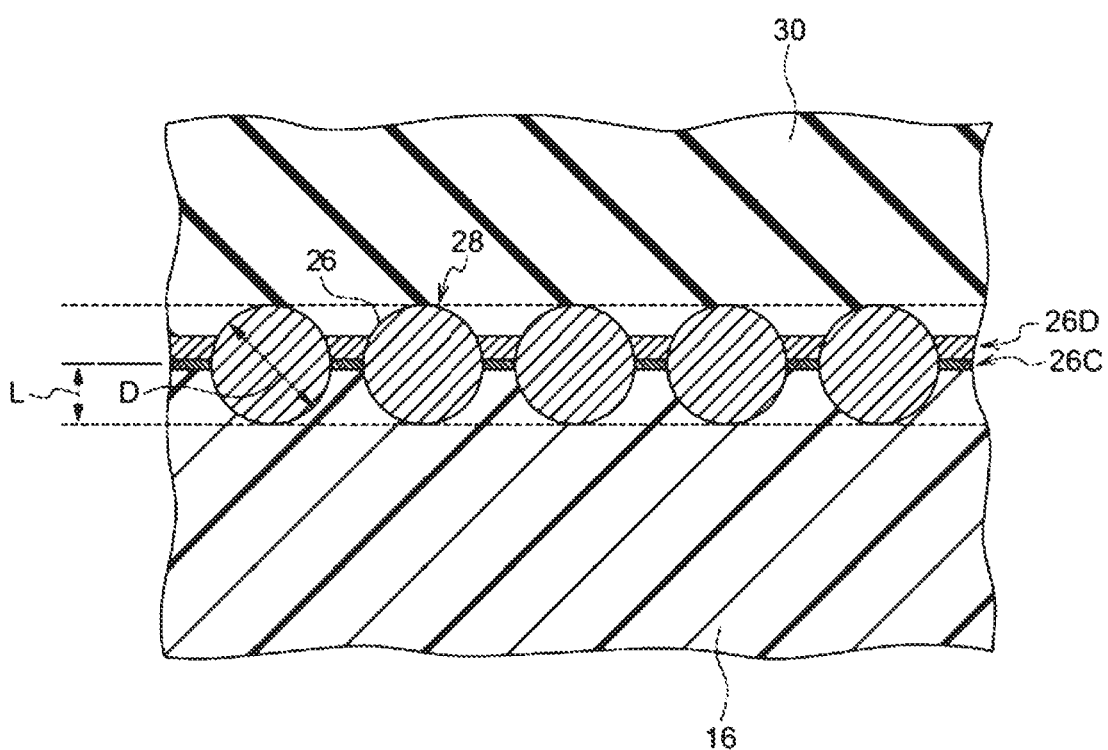
FIG. 4 is a sectional view of the crown portion of the tire frame of the tire according to the first embodiment, in which reinforcing cords are embedded, along the tire width direction.

The reinforcing cord layer 28 formed by the reinforcing cord 26 is described below with reference to FIG. 4. FIG. 4 is a cross-sectional view taken along the tire rotation axis, which illustrates a state in which the reinforcing cord 26 is embedded in the crown portion 16 of the tire case of the tire according to the first embodiment. The tread 30 is adhered to the crown portion 16 via the intermediate layer (i.e., an RFL layer 26C and a rubber adhesive layer 26D). As illustrated in FIG. 4, the reinforcing cord 26 is helically wound in a state in which at least a part of the reinforcing cord 26 is embedded in the crown portion 16 in a cross-sectional view taken along the axial direction of the tire case 17, and, together with a part of the outer circumferential portion of the tire case 17, forms the reinforcing cord layer 28 indicated by the intermittent lines in FIG. 4. The part of the reinforcing cord 26 that is embedded in the crown portion 16 is in close contact with the polyamide thermoplastic elastomer that forms the crown portion 16 (the tire case 17). As the reinforcing cord 26, a monofilament (single filament) of a metal fiber, an organic fiber, or the like, or a multifilament (stranded filament) in which such fibers are stranded, such as a steel cord composed of stranded steel fibers, may be used. In the first embodiment, a steel cord is used as the reinforcing cord 26.

The depth L of embedding in FIG. 4 illustrates the depth of embedding of the reinforcing cord 26 in the tire case 17 (the crown portion 16) along the tire rotation axis direction. The depth L of embedding of the reinforcing cord 26 in the crown portion 16 is preferably equal to or greater than $1/5$ of the diameter D of the reinforcing cord 26, and more preferably more than $1/2$ of the diameter D of the reinforcing cord 26. It is more preferable that the entire reinforcing cord 26 is embedded in the crown portion 16. In a case in which the depth L of embedding of the reinforcing cord 26 is more than $1/2$ of the diameter D of the reinforcing cord 26, the reinforcing cord 26 is difficult to drop off from the embedded portion due to the dimensions of the reinforcing cord 26. In a case in which the entire reinforcing cord 26 is embedded in the crown portion 16, the surface (the outer circumferential surface) becomes flat, whereby entry of air into an area around the reinforcing cord can be reduced even when a member is placed on the crown portion 16 in which the reinforcing cord 26 is embedded. The reinforcing cord layer 28 corresponds to a belt disposed on the outer circumferential surface of a carcass of a conventional pneumatic rubber tire.

As described above, the tread 30 is disposed on the tire-radial-direction outer circumferential side of the reinforcing cord layer 28. It is preferable that the same type of rubber as that used for conventional pneumatic rubber tires is used as the rubber used for the tread 30. In the tread 30 (the rubber member), a tread pattern composed of plural grooves is formed on the contact surface that comes into contact with a road surface, similar to conventional pneumatic rubber tires.

A method of producing a tire according the first embodiment is described below.

Step of Forming Tire Case

First, as described above, tire case half parts are formed using a resin material containing at least one of the specific resins. Preferably, these tire cases are formed by injection molding. The hardness of the tire case formed from the resin material satisfies from 100 MPa to 600 MPa.

Next, the tire case half parts held by a thin metal holding ring are faced with each other. Thereafter, a joining mold (not illustrated in the drawings) is placed so as to be in contact with the outer circumferential surface of butt portions of the tire case half parts. The joining mold is configured to press the area around the joining portions (butt portions) of the tire case half parts 17A at a predetermined pressure. Then, the area around the joining portions of the tire case half parts is pressed at a temperature of the melting point or higher of the thermoplastic resin forming the tire case. On being heated and pressed by the joining mold, the joining portions of the tire case half parts are melted and tire frame half parts are fused, so that the members together form a tire case 17. It is noted that although the joining portions of the tire case half parts are heated using the joining mold in the first embodiment, the invention is not restricted to the first embodiment. For example, the tire case half parts may be joined by heating the joining portions by using a separately provided high-frequency heater or the like, or by softening or melting the joining portions by hot air, infrared radiation or the like and then pressing the joining portions with the joining mold.

Reinforcing Cord Member Winding Process

Figure 5:
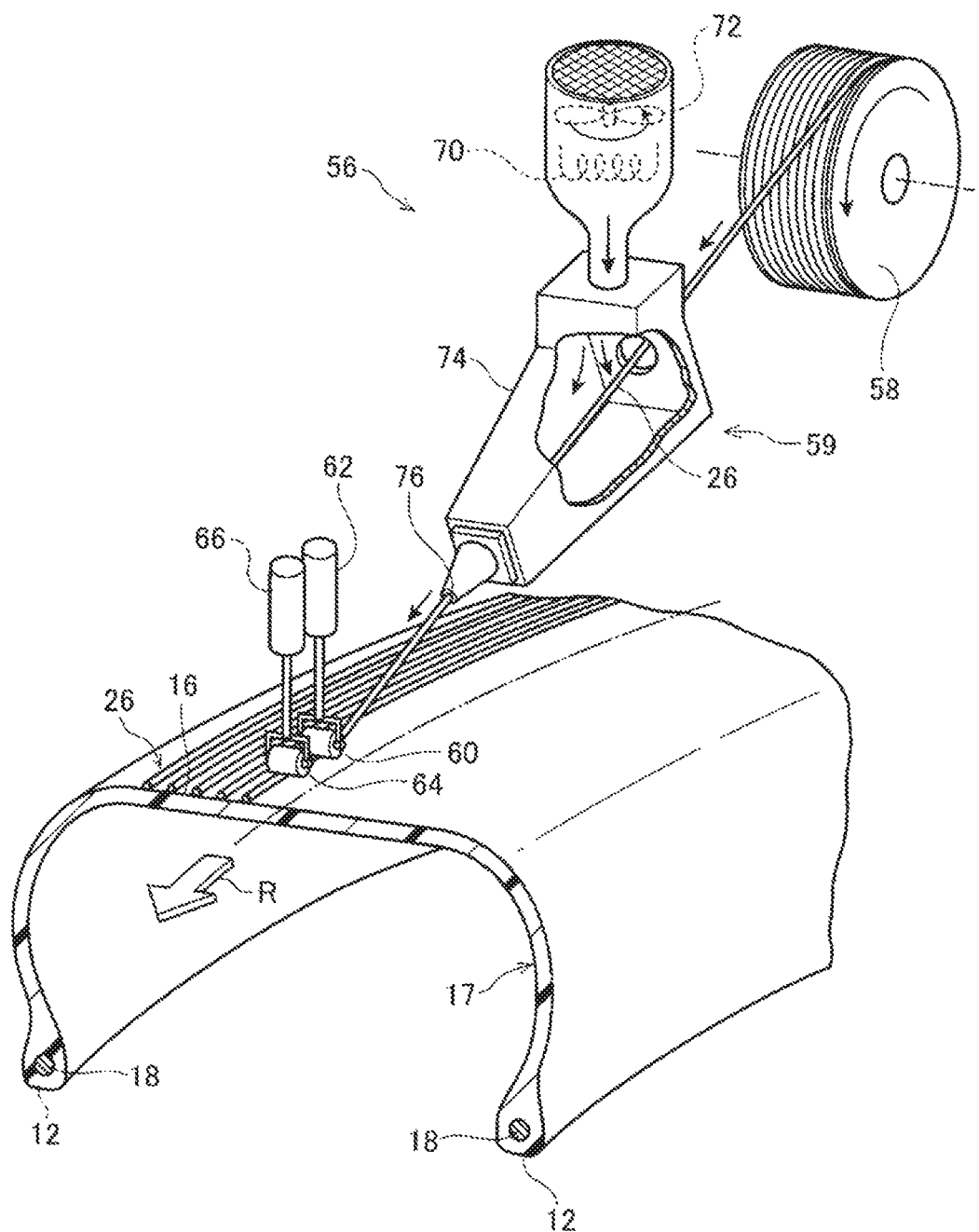
FIG. 5 is a drawing for explaining an operation to embed a reinforcing cord in the crown portion of the tire frame using a cord-heating device and rollers.

Next, a reinforcing cord winding process is described below with reference to FIG. 5. FIG. 5 is an explanatory diagram explaining an operation of embedding the reinforcing cord in the crown portion of the tire case using a cord heating device and rollers. In FIG. 5, a cord feeding apparatus 56 includes a reel 58 on which a reinforcing cord 26 is wound, a cord heating device 59 disposed at the downstream side in the cord feeding direction of the reel 58, a first roller 60 disposed at the downstream side in the reinforcing cord 26 feeding direction, a first cylinder unit 62 for moving the first roller 60 in directions in which the first roller comes into contact with and get away from the outer circumferential surface of the tire, a second roller 64 disposed at the downstream side in the reinforcing cord 26 feeding direction of the first roller 60, and a second cylinder unit 66 for moving the second roller 64 in directions in which the second roller comes into contact with and get away from the outer circumferential surface of the tire. The second roller 64 can be used as a cooling roller formed of metal. In the first embodiment, the surface of the first roller 60 or the second roller 64 is coated with a fluororesin (TEFLON (registered trademark) in the case of the first embodiment) with a view to suppressing adhesion of the melted or softened thermoplastic resin. Although the cord feeding apparatus 56 is configured to have two rollers of the first roller 60 and the second roller 64 in the first embodiment, the invention is not limited to this configuration, and the cord feeding apparatus may be configured to have only one of these rollers (that is, a single roller).

The cord heating device 59 includes a heater 70 and a fan 72 that generate hot air. The cord heating device 59 includes a heating box 74 into which hot air is supplied and in which the reinforcing cord 26 passes through the inside space thereof, and an discharge port 76 through which the heated reinforcing cord 26 is discharged.

In this process, first, the temperature of the heater 70 of the cord heating device 59 is increased, and the air around the heater 70 heated by the heater 70 is sent to the heating box 74 by an air current generated by the rotation of the fan 72. Then, the reinforcing cord 26 drawn out from the reel 58 is fed to the inside of the heating box 74 of which the inner space is heated with hot air, whereby the reinforcing cord 26 is heated (for example, to increase the temperature of the reinforcing cord 26 to be about 100° C. to about 200° C.). The heated reinforcing cord 26 passes through the discharge port 76, and is helically wound, with a constant tension, around the outer circumferential surface of the crown portion 16 of the tire case 17 rotating in the direction of arrow R in FIG. 5. Here, as a result of the heated reinforcing cord 26 coming into contact with the outer circumferential surface of the crown portion 16, the resin material at the contact portion is melted or softened, and at least a part of the heated reinforcing cord 26 is embedded in the outer circumferential surface of the crown portion 16. In this process, since the heated reinforcing cord 26 is embedded in the melted or softened resin material, the resin material and the reinforcing cord 26 get into a state in which no space is left therebetween, that is, in a tightly-contacted state. Accordingly, entry of air into the portion in which the reinforcing cord 26 is embedded is suppressed. By heating the reinforcing cord 26 to a temperature higher than the melting point or the softening point of the resin material of the tire case 17, the melting or softening of the resin material in the portion contacting the reinforcing cord 26 is promoted. By employing this configuration, embedding of the reinforcing cord 26 in the outer circumferential surface of the crown portion 16 is facilitated, and entry of air can effectively be reduced.

The depth L of embedding of the reinforcing cord 26 can be adjusted by the heating temperature for the reinforcing cord 26, the tension applied to the reinforcing cord 26, the pressure applied from the first roller 60, or the like. In the first embodiment, the depth L of embedding of the reinforcing cord 26 is set to be equal to or greater than ⅕ of the diameter D of the reinforcing cord 26. The depth L of embedding of the reinforcing cord 26 is more preferably more than ½ of the diameter D, and it is still more preferable that the entire reinforcing cord 26 is embedded.

In this way, a reinforcing cord layer 28 is formed on the outer circumference side of the crown portion 16 of the tire case 17 by winding the heated reinforcing cord 26 on the outer circumferential surface of the crown portion 16 such that the heated reinforcing cord 26 is embedded in the outer circumferential surface of the crown portion 16.

Next, to the surface of the crown portion 16 of the tire case 17 in contact with the crown portion 16 of the tread 30, an RFL adhesive and a rubber adhesive composition as an aqueous cement are applied in this order. For the application, an air spray method or a dipping method can be used.

Around the outer circumferential surface of the tire case 17 coated with the rubber adhesive composition (aqueous cement) described above, a belt-shaped tread 30 as an unvulcanized rubber member is wound for one turn to adhere the tread 30 to the outer circumferential surface of the tire case 17. As the tread 30, for example, a conventionally known precured tread used for retreaded tires can be used. This step is performed in the same manner as a step of adhering a precured tread to the outer circumferential surface of a base tire for retreading.

Vulcanization Process

Next, the tire case 17 to which the tread 30 is bonded is housed in a vulcanization can or mold and vulcanized. By performing vulcanization, a chemical bond between the latex rubber of the RFL adhesive and the rubber of the rubber adhesive layer, and a chemical bond between the rubber of the rubber adhesive layer and the rubber in the tread are newly formed, and as a result, the connection between the tread 30 which is a rubber member and the tire case 17 which is a resin member becomes stronger.

A tire 10 can be completed by bonding a sealing layer 24 formed of a vulcanized rubber to the bead portion 12 of the tire case 17 using, for example, an adhesive.

After completion of the tire 10, an annealing treatment for heating the tire 10 may be further performed. By performing the annealing treatment after completion of the tire, the degree of crystallization of a hard segment of the polyamide thermoplastic elastomer contained in the resin material can also be adjusted. The heating temperature in the annealing treatment is preferably from the glass transition temperature to 140, and more preferably from 50° C. to 140° C. It is preferable to gradually cool down to room temperature (for example 25° C.) after heating the tire 10.

Effects

In the first embodiment, the tire case 17 of the tire 10 includes one of the specific resins, and in addition the tire case 17 and the tread 30 (rubber member) are adhered via the RFL adhesive and the rubber adhesive composition, which results in high peel resistance. Moreover, since the hardness values of the resin member, the resin adhesive layer, the rubber adhesive layer, and the rubber member all satisfy from 100 MPa to 600 MPa, the tire is excellent in resistance with respect to external forces as well as in peel resistance, and thus has an improved durability. Furthermore, since no cushion rubber is used, the tire structure can be simplified, which results in smaller rubber weight than that of conventional tires. Thus, when the tire 10 in the first embodiment is applied to automobiles, the tire can have a further improved durability and a reduced weight, so that the fuel efficiency of automobiles employing the tire can be improved. In addition, the tire 10 in the first embodiment employs an aqueous cement as the rubber adhesive composition, the ease of attaching the tread 30 to the tire case 17 during tire manufacturing is improved.

Furthermore, the polyamide thermoplastic elastomer has high adhesiveness to the reinforcing cord 26, and also exhibits excellent fixing performance such as welding strength. Therefore, the phenomenon in which air remains in the surroundings of the reinforcing cord 26 in the reinforcing cord winding process (entry of air) can be suppressed in particular. In a case in which adhesiveness and welding properties to the reinforcing cord 26 are high, and entry of air into the surroundings of the reinforcing cord member is suppressed, the displacement of the reinforcing cord 26, for example, due to applied force during running can be effectively suppressed. As a result, for example, even in a case in which a tire component member is disposed so as to cover the entirety of the reinforcing cord member in the outer circumference of the tire frame, the displacement of the reinforcing cord member is suppressed. As a result, abrasion and damage of these members (including the tire frame) are reduced, resulting in the improvement in durability of the tire 10.

In the tire 10 according to the first embodiment, the reinforcing cord 26 having higher stiffness than the polyamide thermoplastic resin is helically wound in the circumferential direction around the outer circumferential surface of the crown portion 16 of the tire case 17 made of the polyamide thermoplastic resin, whereby puncture resistance, cut resistance, and stiffness in the circumferential direction of the tire 10 are improved. The improvement in stiffness in the circumferential direction of tire 10 prevents the creeping of the tire case 17 made of the polyamide thermoplastic resin.

Furthermore, since at least a part of the reinforcing cord 26 is embedded in the outer circumferential surface of the crown portion 16 of the tire case 17 formed from the polyamide thermoplastic resin and is closely adhered to the surrounding polyamide thermoplastic resin in the cross-sectional view taken along the axial direction of the tire case 17 (the cross-section illustrated in FIG. 4), entry of air during production is reduced, and the displacement of the reinforcing cord 26, for example, due to applied force during running is reduced. As a result, for example, abrasion of the reinforcing cord 26, the tire case 17, and the tread 30 is reduced, resulting in the improvement in durability of the tire 10.

As shown in FIG. 4, since the depth L of embedding of the reinforcing cord 26 is ⅕ or more of the diameter D, air entrainment during manufacturing is effectively reduced, and furthermore moving of the reinforcing cord 26 due to an input force during traveling is reduced.

When the reinforcing cord 26 is embedded and fixed in a polyamide thermoplastic resin in this manner, the reinforcing cord 26 can be more closely fixed to the tire case 17 than the case where the reinforcing cord 26 is fixed with a cushion rubber. This can effectively prevent the air entrainment described above and effectively inhibit the reinforcing cord member from moving during travelling.

In a case in which the reinforcing cord is a steel cord, the reinforcing cord 26 can easily be separated from the polyamide thermoplastic resin by heating and recovered at the time of disposing of the tire, and, therefore, there is an advantage from the viewpoint of recyclability of the tire 10. Resin materials usually have a loss factor (tan δ) lower than that of vulcanized rubbers. Accordingly, when the reinforcing cord layer contains a large amount of resin materials, the rolling properties of the tire can be enhanced. Resin materials, having a higher elastic modulus relative to vulcanized rubbers, are advantageous in that the resin materials have high in-plane shear stiffness, and also provide excellent steering stability and excellent abrasion resistance at the time of traveling with the tire.

Since the tread 30 that comes into contact with a road surface is formed of a rubber material having higher abrasion resistance than that of the polyamide thermoplastic resin, the abrasion resistance of the tire 10 is improved.

Since the annular bead core 18 formed of a metal material is embedded in the bead portion 12, the tire case 17 is strongly fixed to the rim 20, i.e., the tire 10 is strongly fixed to the rim 20, similarly to conventional rubber pneumatic tires.

Since the sealing layer 24 formed of a rubber material having higher sealing property than that of the polyamide thermoplastic resin is disposed in a region of the bead portion 12 that contacts the rim 20, sealing property between the tire 10 and the rim 20 is improved. Therefore, the air leaking within the tire is further reduced, as compared to a case in which the tire is sealed only with the rim 20 and the polyamide thermoplastic resin. Further, the installation of the sealing layer 24 also improves the fittability to a rim.

Although the first embodiment is configured such that the reinforcing cord 26 is heated to melt or soften the polyamide thermoplastic resin in a portion that contacts the heated reinforcing cord 26, the invention is not limited to this configuration. An embodiment in which a hot air generating apparatus is used, instead of heating the reinforcing cord 26, to heat the outer circumferential surface of the crown portion 16 into which the reinforcing cord 26 is to be embedded, and then the reinforcing cord 26 is embedded in the crown portion 16 may be employed.

Although the first embodiment is configured such that the heat source of the cord heating device 59 includes the heater and the fan, the invention is not limited to this configuration. An embodiment in which the reinforcing cord 26 is directly heated by radiation heat (for example, infrared rays) may be employed.

Although the first embodiment is configured such that a region at which the polyamide thermoplastic resin with the reinforcing cord 26 embedded therein is melted or softened is forcibly cooled with the second roller 64 formed of metal. However, the invention is not limited to this configuration, and an embodiment in which the region at which the polyamide thermoplastic resin is melted or softened may be forcibly cooled and solidified by directly applying cold air thereto may be employed.

Although the first embodiment is configured such that the reinforcing cord 26 is heated, an embodiment in which the outer circumference of the reinforcing cord 26 is covered, for example, using the same polyamide thermoplastic resin as the tire case 17 may be employed. In this case, the covering polyamide thermoplastic resin is heated together with the reinforcing cord 26 when the covered reinforcing cord is wound around the crown portion 16 of the tire case 17, whereby entry of air during the embedment of the reinforcing cord into the crown portion 16 can be efficiently reduced.

The reinforcing cord 26 is helically wound from the easiness in production. However, the reinforcing cord 26 may be wound in another method in which the reinforcing cord 26 is discontinuous in the width direction of the tire.

Although the tire 10 according to the first embodiment is a so-called tubeless tire in which an air room is formed between the tire 10 and the rim 20 by mounting the bead portion 12 on the rim 20, the invention is not limited to this configuration, and the tire may have a complete tube shape.

Second Embodiment

Next, the method of manufacturing the tire and the second embodiment of the tire will be described with reference to the drawings. In the second embodiment, the tire case and the coated cord member are both resin members.

Figure 6A:
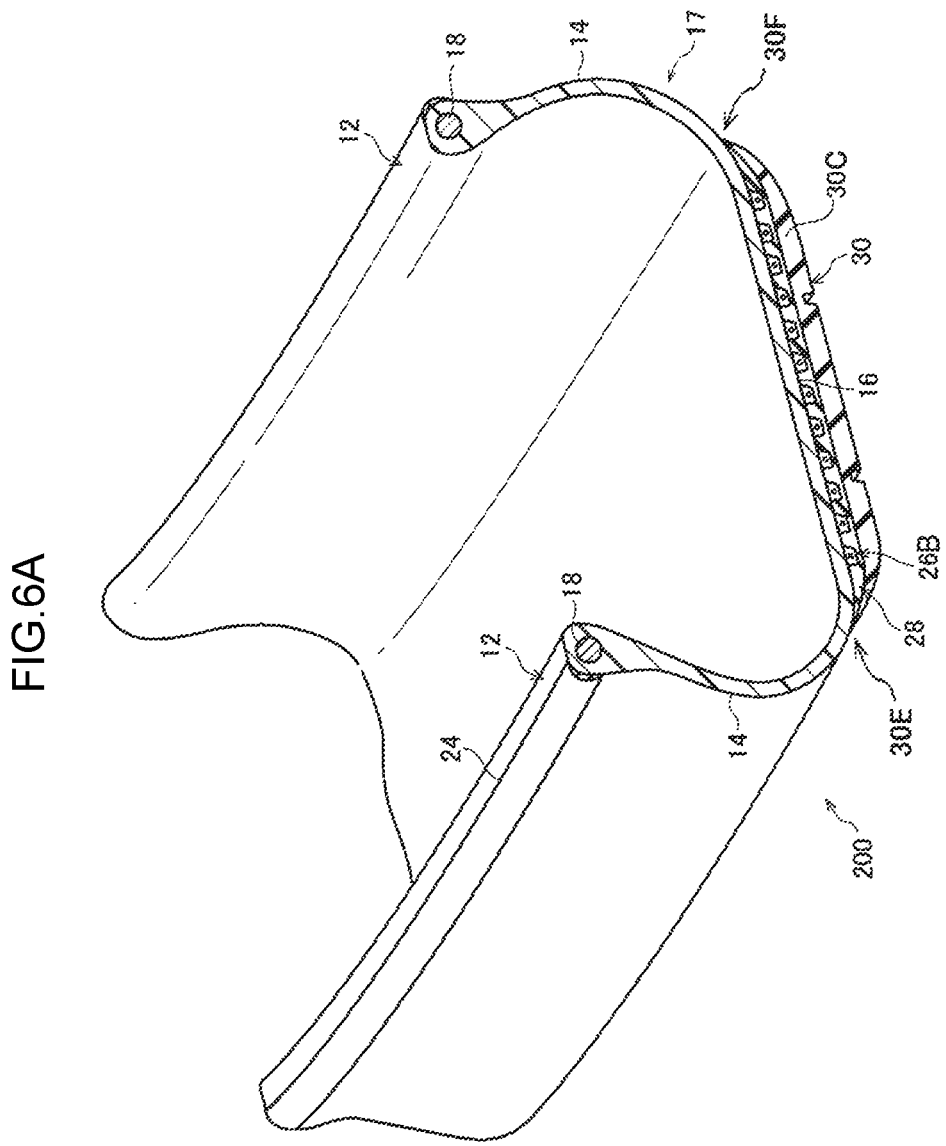
FIG. 6A is a perspective sectional view of the tire according to the second embodiment along the tire width direction.
Figure 6B:
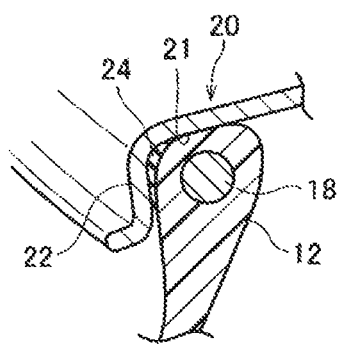
FIG. 6B is an enlarged sectional view of the bead portion of the tire according to the second embodiment fitted to a rim, along the tire width direction.
Figure 7:
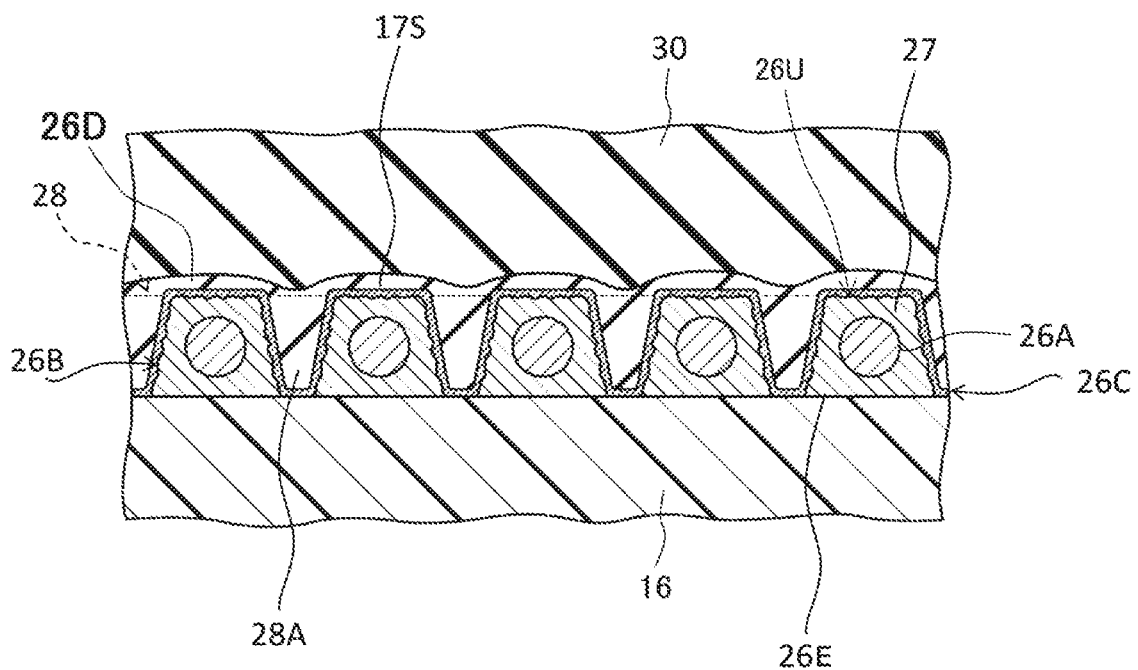
FIG. 7 is a circumferential sectional view of the reinforcing cord layer of the tire according to the second embodiment along the tire width direction.

As in the first embodiment described above, the tire in the second embodiment has a substantially the same cross-sectional shape as those of conventional common rubber pneumatic tires. Thus, in the following drawings, the same components as those in the first embodiment are denoted by the same reference numerals, and their descriptions are omitted. FIG. 6A is a cross-sectional view of the tire in the second embodiment along the tire width direction. FIG. 6B is an enlarged sectional view of the bead portion of the tire in the second embodiment fitted to a rim, along the tire width direction. FIG. 7 is a circumferential sectional view of the reinforcing cord layer of the tire according to the second embodiment along the tire width direction. In FIG. 6A, the intermediate layer (the resin adhesive layer and the rubber adhesive layer) is located between the crown portion 16 and the tread 30, and is formed in a range from 30E to 30F along the circumference of the crown portion 16.

Similarly to the first embodiment, a tire case 17 of the tire according to the second embodiment is formed of a polyamide thermoplastic elastomer (TPA) ("UBESTA XPA9055" manufactured by Ube Industries, Ltd.). In a tire 200 according to the second embodiment, a reinforcing cord layer 28 (indicated by a dotted line in FIG. 7) in which a coated cord member 26B is wound in the circumferential direction is layered on a crown portion 16, as shown in FIGS. 6A and 7. The reinforcing cord layer 28 constitutes the outer circumferential portion of the tire case 17, and reinforces the rigidity in the circumferential direction of the crown portion 16. The outer circumferential surface of the reinforcing cord layer 28 contacts a tread 30 via a rubber adhesive layer 26D adhered to and superposed on an RFL layer 26C, that is, an intermediate layer.

As shown in FIG. 7, the coated cord member 26B is formed by coating a cord member 26A, that has higher rigidity than that of the polyamide thermoplastic elastomer that forms the tire case 17, with a coating polyamide thermoplastic resin (hereinafter referred to as an "coating resin material") 27 that is an different member from the polyamide thermoplastic elastomer that forms the tire case 17. In regions in which the coated cord member 26B contacts the crown portion 16, the coated cord member 26B and the crown portion 16 are bonded to each other via the RFL layer 26C formed of an RFL adhesive.

The elastic modulus of the coating resin material 27 is preferably set within a range of from 0.1 times to 10 times the elastic modulus of the resin material forming the tire case 17. In a case in which the elastic modulus of the coating resin material 27 is not more than 10 times the elastic modulus of the polyamide thermoplastic resin forming the tire case 17, the crown portion does not become too hard, facilitating the rim assembling property. In a case in which the elastic modulus of the coating resin material 27 is than 0.1 times or more the elastic modulus of the polyamide thermoplastic resin forming the tire case 17, a resin constituting the reinforcing cord layer 28 is not too soft, and the in-plane shear stiffness of the belt is high, and cornering power is improved. In the second embodiment, a material ("UBESTA XPA9055X1" manufactured by Ube Industries, Ltd.) similar to a polyamide thermoplastic resin forming the tire case 17 is used as the coating resin material 27.

As shown in FIG. 7, the coated cord member 26B has a substantially trapezoidal cross-sectional shape. In the following description, the top surface (the outer surface in the tire radial direction) of the coated cord member 26B is designated by reference numeral 26U, and the bottom surface (the inner surface in the tire radial direction) is designated by reference numeral 26E. Although the second embodiment is configured such that the cross-sectional shape of the coated cord member 26B is substantially trapezoidal, the invention is not limited to this configuration. The cross-sectional shape of the coated cord member 26B may be any shape other than a shape in which the width increases from the bottom surface 26E side (the inner side in the tire radial direction) to the top surface 26U side (the outer side in the tire radial direction).

As shown in FIG. 7, since plural coated cord members 26B are arranged with intervals in the circumferential direction, gaps 28A are formed between adjacent coated cord members 26B. Accordingly, the outer circumferential surface of the reinforcing cord layer 28 has irregularities, and the outer circumferential surface 17S of the tire case 17 of which the outer circumferential portion is formed of the reinforcing cord layer 28 also has irregularities.

Minute roughening irregularities are uniformly formed on the outer circumferential surface 17S (including irregularities) of the tire case 17, and the rubber adhesive layer 26D is bonded thereon via the RFL layer 26C. The rubber portion at the inner side in the radial direction of the rubber adhesive layer 26D has flowed into the roughening irregularities.

A tread 30 formed of a material, such as rubber, having higher abrasion resistance than that of the resin material forming the tire case 17 is bonded onto the rubber adhesive layer 26D (onto the outer circumferential surface of the rubber adhesive layer 26D).

The rubber (tread rubber 39C) to be used in the tread 30 is preferably rubber similar to those used in the conventional rubber pneumatic tires. In the tread 30, a tread pattern (not shown in the drawings) composed of plural grooves is formed on the contact surface that comes into contact with a road surface, similar to conventional pneumatic rubber tires.

While modes for carrying out the invention have been described above with reference to embodiments, for the purpose of illustration only, various modifications may be made without departing from the spirit and scope of the invention. Specifically, for example, in the first embodiment and the second embodiment, while description has been made on modes where the tread 30 is a rubber member, the invention is not restricted to the modes, and other members (for example, side rubber) may be rubber members. When other members are rubber members, for example, a tread formed from another type of resin material that is more excellent in wear resistance than the resin material forming the tire case 17 may be used instead of the tread 30.

It is to be understood that the scope of right of the invention is not restricted to these embodiments.

In the following, a method of producing a tire according to the second embodiment is described.

Tire Case Forming Process

First, tire case half parts 17A are formed in the same manner as in the first embodiment, and the tire case half parts are heated and pressurized using a mold for bonding, thereby forming a tire case 17.

Process of Winding Reinforcing Cord Member

The apparatus for manufacturing the tire in the second embodiment is the same as in the first embodiment described above. A coated cord member 26B that is obtained by coating a cord member 26A with a coating resin material 27 (a polyamide thermoplastic material), has a substantial trapezoidal shape in a cross-sectional view, and is wound around a reel 58 is used in a cord supplier 56 shown in FIG. 5 in the first embodiment described above.

First, the temperature of the heater 70 is increased, and the air around the heater 70 heated by the heater 70 is sent to the heating box 74 by an air current generated by the rotation of the fan 72. Then, the coated cord member 26B drawn out from the reel 58 is fed to the inside of the heating box 74 of which the inner space is heated with hot air, whereby the reinforcing cord member is heated (for example, to increase the temperature of the outer circumferential surface of the reinforcing cord member 26B to be equal to or higher than the melting point of the coating resin material 27). Here, as a result of the heating of the coated cord member 26B, the coating resin material 27 becomes melted or softened.

The coated cord member 26B passes through the discharge port 76, and is helically wound, with a constant tension, around the outer circumferential surface of the crown portion 16 of the tire case 17 rotating in a direction toward the bottom of the drawing. At this time, the bottom surface 26E of the coated cord member 26B comes into contact with the outer circumferential surface of the crown portion 16. The melted or softened coating resin material 27 at the contact portion spreads on the outer circumferential surface of the crown portion 16, and the coated cord member 26B is welded to the outer circumferential surface of the crown portion 16. Thereby, the bonding strength between the crown portion 16 and the coated cord member 26B is increased.

Roughening Treatment Process

Subsequently, in a blasting apparatus not shown in the drawings, a blasting abrasive is shot at a high speed to the outer circumferential surface 17S of the tire case 17 while the tire case 17 is rotated. The blasting abrasive that has been shot collides with the outer circumferential surface 17S, thereby forming minute roughening irregularities with an arithmetic average roughness Ra of 0.05 mm or more on the outer circumferential surface 17S.

By forming minute roughening irregularities on the outer circumferential surface 17S of the tire case 17 in this manner, the outer circumferential surface 17S is made hydrophilic, and the wettability of the resin adhesive composition is improved.

Layer Formation Process

Subsequently, an RFL adhesive is applied to the outer circumferential surface 17S of the tire case 17 that has been subjected to the roughening treatment, thereby forming an RFL layer 26C.

Next, an unvulcanized rubber adhesive composition (aqueous cement) is applied to the outer circumferential surface 17S coated with the RFL adhesive to form a rubber adhesive layer 26D. Thereafter, a vulcanized or semi-vulcanized tread rubber 30C is wound for one turn on the rubber adhesive layer 26D to achieve a state of a green tire case.

Vulcanization Process

Then, the green tire case is housed in a vulcanization can or a mold, and is vulcanized. Once the vulcanization is completed, a chemically cross-linked structure is formed between the RFL layer 26C and the rubber adhesive layer 26D to increase the bonding strength. That is, the bonding strength between the tire case 17 and the tread 30, and between the coated cord member 26B and the tread 30 is enhanced due to the presence of the RFL layer 26C and the rubber adhesive layer 26D.

A tire 200 is completed by adhering a sealing layer 24 formed of a soft material softer than the resin material to the bead portion 12 of the tire case 17 by using an adhesive or the like.

Effects

In the tire 200 in the second embodiment, since the tire case 17 and the coated cord member 26B are adhered to the RFL layer 26C and the rubber adhesive layer 26D, the tire case 17 and the coated cord member 26B (i.e., the resin member described above), and the tread 30 (i.e., the rubber member described above) are sufficiently adhered. This can improve the durability and the like of the tire 200. Moreover, since the tread 30 is attached to the adhesive aqueous cement, good workability is achieved. Furthermore, since no cushion rubber is used as in the first embodiment described above, when the tire 200 in the second embodiment is applied to automobiles, the tire can have a further improved durability and a reduced weight, so that the fuel efficiency of automobiles employing the tire can be improved.

It is noted that while in the second embodiment the surface of the tire case 17 and the surface of the coated cord member 26B are both coated with the RFL layer 26C, the invention is not restricted to the second embodiment and the RFL layer 26C may be applied to only one of the surface of the tire case 17 and the surface of the coated cord member 26B.

The tire 200 according to the second embodiment, in which the tire case 17 is formed of the polyamide thermoplastic elastomer, has excellent heat resistance, excellent tensile modulus of elasticity, excellent tensile strength, and excellent fracture strain. In addition, the tire 200 according to the second embodiment is lighter in weight since it has a simple structure compared to those of conventional rubber tires. Therefore, the tire 200 according to the second embodiment has high abrasion resistance and high durability. The polyamide thermoplastic elastomer forming the tire case 17 has a melting point of 162° C. Thus, the tire case half parts 17A can be sufficiently bonded at, for example, about 250° C., and, therefore, energy consumption can be reduced, and the cost required for heating can be reduced.

In a case in which the reinforcing cord layer 28 contains the coated cord member 26B as described above, the difference in hardness between the tire case 17 and the reinforcing cord layer 28 can be reduced as compared with a case in which the cord member 26A is fixed simply with the cushion rubber, and therefore the coated cord member 26B can be further closely adhered and fixed to the tire case 17. As a result, entry of air as described above can be efficiently reduced, and the displacement of the reinforcing cord member during running can be further suppressed.

In a case in which the cord member 26A is a steel cord, the cord member 26A can easily be separated from the coated cord member 26B by heating and recovered at the time of disposing of the tire, and, therefore, there is an advantage from the viewpoint of recyclability of the tire 200. Further, since polyamide thermoplastic elastomers has a loss factor (tan δ) lower than that of vulcanized rubbers. Accordingly, when the reinforcing cord layer 28 contains a large amount of polyamide thermoplastic elastomers, the rolling properties of the tire can be enhanced. Polyamide thermoplastic elastomers, having a higher in-plane shear stiffness relative to vulcanized rubbers, are advantageous in that the polyamide thermoplastic elastomers provide excellent steering stability and excellent abrasion resistance at the time of traveling with the tire.

In the method for producing a tire according to the second embodiment, when the tire case 17 and the tread rubber 30 are integrated via the RFL layer 26C and the rubber adhesive layer 26D, the bonding properties (adhesion properties) is improved by the anchor effect since the outer circumferential surface 17S of the tire case 17 has been subjected to the roughening treatment. Further, since the resin material forming the tire case 17 is ploughed due to collision of the blasting abrasive, the wettability of the resin adhesive composition is improved. Therefore, the resin adhesive composition is retained, in a uniformly applied state, on the outer circumferential surface 17S of the tire case 17, whereby the bonding strength between the tire case 17 and the rubber adhesive layer 26D can be ensured.

Even in a configuration in which the outer circumferential surface 17S of the tire case 17 has irregularities, by allowing the blasting abrasive to collide with a recess (the gaps 28A), the area around the recess (walls at the recess, the bottom of the recess) is subjected to the roughening treatment, and thus the bonding strength between the tire case 17 and the rubber adhesive layer 26D may be ensured.

The rubber adhesive layer 26D is superposed on the roughened area of the outer circumferential surface 17S of the tire case 17, whereby the bonding strength between the tire case 17 and the rubber adhesive layer 26D via the RFL layer 26C can be effectively ensured.

The reinforcing cord layer 28 constitutes the outer circumferential portion of the tire case 17, whereby puncture resistance and cutting resistance are improved, compared with a case in which a member other than the reinforcing cord layer 28 constitutes the outer circumferential portion.

The reinforcing cord layer 28 is formed by winding the coated cord member 26B, whereby the rigidity in the circumferential direction of the tire 200 is improved. In a case in which the rigidity in the circumferential direction is improved, creeping of the tire case 17 (a phenomenon in which the plastic deformation of the tire case 17 increases with lapse of time under a constant stress) is suppressed, and pressure resistance to air pressure applied from the inner side in the tire radial direction is improved.

Although the second embodiment is configured such that irregularities are formed on the outer circumferential surface 17S of the tire case 17, the invention is not limited to this configuration. An embodiment in which the outer circumferential surface 17S is formed flat may be employed.

In the tire case 17, a reinforcing cord layer may be formed by covering, with a coating polyamide thermoplastic material, the coated cord member that has been wound on the crown portion of the tire case and bonded thereto. In this case, a coating layer can be formed by ejecting the coating polyamide thermoplastic material in the melted or softened state onto the reinforcing cord layer 28. The coating layer may be formed without using an extruder, by heating a welding sheet into a melted or softened state, and attaching the welding sheet to the surface (the outer circumferential surface) of the reinforcing cord layer 28.

Although the second embodiment is configured such that case divided parts (tire case half parts 17A) are joined together to form the tire case 17, the invention is not limited to this configuration. The tire case 17 may be formed as an integrated body using, for example, a mold.

The tire 200 according to second embodiment is a so-called tubeless tire in which an air room is formed between the tire 200 and the rim 20 by mounting the bead portion 12 on the rim 20. However, the invention is not limited to this configuration, and the tire 200 may have, for example, a complete tube shape.

Although the second embodiment is configured such that the coated cord member 26B is helically wound on the crown portion 16, the invention is not limited to this configuration. An embodiment in which the coated cord member 26B is wound but discontinuous (for example, annular) may be employed.

In a case in which both the tire case 17 and the coated cord member 26B are heated to get into a melted or softened state, both materials mix with each other well, thereby increasing the bonding strength. The resin material that forms the tire case 17 and the coating resin material 27 that forms the coated cord member 26B are preferably thermoplastic resin materials of the same kind, and more preferably the same thermoplastic material.

The outer circumferential surface 17S of the tire case 17 that has been subjected to the roughening treatment may be subjected to corona treatment, plasma treatment, or the like to activate the outer circumferential surface 17S and to enhance the hydrophilicity, and then the RFL adhesive may be applied thereto.

<Method of Manufacturing Tire>

The method of manufacturing a tire includes the following steps of:

(A) forming a resin member using at least one resin selected from the group consisting of a polyamide resin, a polyamide thermoplastic elastomer, a polyester resin, and a polyester thermoplastic elastomer;

(B) obtaining a layered body by layering, on the resin member formed in step (A):
- a resin adhesive layer disposed by applying a resin adhesive composition;
- a rubber adhesive layer that is adhered to and disposed on a surface of the resin adhesive layer, by applying a rubber adhesive composition to a side of the resin adhesive layer that is opposite from a side of the resin adhesive layer on which the resin member is disposed; and
- a rubber member disposed on a side of the rubber adhesive layer that is opposite from a side of the rubber adhesive layer on which the resin adhesive layer is disposed; and (C) vulcanizing the layered body after step (B), and, the method is used for production of a tire wherein the rubber adhesive layer obtained in step (C) has a thickness of from 5 μm to 300 μm, and wherein each of a hardness of the resin member (Ha), a hardness of the resin adhesive layer (Hb), a hardness of the rubber adhesive layer (Hc), and a hardness of the rubber member (Hd) obtained in step (C) is from 100 MPa to 600 MPa.

In the step (A), the at least one resin is not particularly restricted as long as it contains at least one of the specific resins. Specific methods for forming the resin member in the step (A) include, for example, methods described in the section on the step of forming tire case in the first embodiment and the second embodiment described later.

In the step (B), a layered body may be obtained by layering, on the resin member formed in the step (A): a resin adhesive layer disposed by applying a resin adhesive composition; a rubber adhesive layer that is disposed by applying a rubber adhesive composition to a side of the resin adhesive layer that is opposite from a side of the resin adhesive layer on which the resin member is disposed and is adhered to the surface of the resin adhesive layer; and a rubber member disposed on a side of the rubber adhesive layer that is opposite from a side of the rubber adhesive layer on which the resin adhesive layer is disposed. The resin adhesive composition, the rubber adhesive composition, and the rubber member can be prepared using the method described above in consideration of the hardness conditions. The members and the layers of the layered body may be formed in any order, and preferably disposed in the order of the resin member, the resin adhesive layer, the rubber adhesive layer, and the rubber member from the viewpoint of the durability and workability during manufacturing of the tire.

An RFL adhesive is preferably used in the resin adhesive composition from the viewpoint of the adhesion between members or layers and production of tires with durability. An RFL layer satisfying the hardness condition can be formed by taking into consideration, for example, the type of the latex rubber in the RFL adhesive, and adjusting the mixing ratio as appropriate, as described above.

When the rubber adhesive composition is applied, it is preferable that the RFL adhesive is applied to the resin member and then dried at 10° C. to 50° C. for 60 minutes to 1,000 minutes, and thereafter the rubber adhesive composition is applied thereto, from the viewpoint of the durability of the tire.

When the rubber adhesive composition contains an aqueous cement, it is preferable that after the rubber adhesive composition is applied, the rubber member is attached at 20° C. to 50° C. within 30 minutes to 1,440 minutes from the viewpoint of the durability of the tire.

In the step (B), a rubber adhesive layer satisfying the hardness condition and having a thickness of from 5 μm to 300 μm is required to be formed on a side of the resin adhesive layer obtained in the step (A) that is opposite from a side of the resin adhesive layer on which the resin member is disposed. Such a rubber adhesive layer can be formed, for example, by using the application method described above.

With respect to the rubber member in the step (B), a rubber member satisfying the hardness condition is required to be disposed to the rubber adhesive layer. As such a rubber member, a rubber member capable of satisfying the hardness condition is preferably used.

In the step (C), the layered body obtained in the step (B) may only be vulcanized. The vulcanization method is not particularly restricted and examples include those disclosed in, for example, JP-A Nos. H11-048264, H11-029658, and 2003-238744. By involving the step, adhesion between the intermediate layer and the rubber member is improved, and as a result, the adhesion strength between the resin member and the rubber member is improved.

The method of manufacturing the tire may further include a step for winding a reinforcing cord member in the first embodiment and the second embodiment described later between the step (A) and the step (B). This step can be included to obtain, for example, a tire case in which reinforcing cord members are partially embedded, or reinforcing cord members separately disposed on a tire case, as a resin member. Thereafter, in the following step (B) and step (C), a tire having a layered structure in which a resin adhesive layer, a rubber adhesive layer, and a rubber member are layered on the resin member can be produced. The tire incorporates the reinforcing cord members in its layered structure, which results in a significant improvement in the durability of the entire tire.

The tire according to the disclosure encompasses tires of the following aspects.

<1> A tire having a layered structure, comprising:
a resin member comprising at least one resin selected from the group consisting of a polyamide resin, a polyamide thermoplastic elastomer, a polyester resin, and a polyester thermoplastic elastomer;
a resin adhesive layer disposed on the resin member;
a rubber adhesive layer that is adhered to a side of the resin adhesive layer that is opposite from a side of the resin adhesive layer on which the resin member is disposed and that has a thickness of from 5 μm to 300 μm; and
a rubber member disposed on a side of the rubber adhesive layer that is opposite from a side of the rubber adhesive layer on which the resin adhesive layer is disposed,
wherein the tire is vulcanized, and
wherein each of a hardness of the resin member (Ha), a hardness of the resin adhesive layer (Hb), a hardness of the rubber adhesive layer (Hc), and a hardness of the rubber member (Hd) is from 100 MPa to 600 MPa.

<2> The tire according to <1>, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2:

$$Ha < Hb \leq Hc < Hd \qquad \text{Formula 1}$$

$$Ha > Hb \geq Hc > Hd. \qquad \text{Formula 2}$$

<3> The tire according to <1> or <2>, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 350 MPa or less.

<4> The tire according to any one of <1> to <3>, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 200 MPa or less.

<5> The tire according to any one of <1> to <4>, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 100 MPa or less.

<6> The tire according to any one of <1> to <5>, wherein the resin adhesive layer comprises a resorcinol-formalin-latex adhesive.

<7> The tire according to any one of <1> to <6>, wherein the resin adhesive layer has a thickness of from 0.5 μm to 30 μm.

<8> A method of manufacturing a tire, comprising steps of:
(A) forming a resin member using at least one resin selected from the group consisting of a polyamide resin, a polyamide thermoplastic elastomer, a polyester resin, and a polyester thermoplastic elastomer;
(B) obtaining a layered body by layering, on the resin member formed in step (A):
  a resin adhesive layer disposed by applying a resin adhesive composition;
  a rubber adhesive layer that is adhered to and disposed on a surface of the resin adhesive layer, by applying a rubber adhesive composition to a side of the resin adhesive layer that is opposite from a side of the resin adhesive layer on which the resin member is disposed; and
  a rubber member disposed on a side of the rubber adhesive layer that is opposite from a side of the rubber adhesive layer on which the resin adhesive layer is disposed; and
(C) vulcanizing the layered body after step (B),
wherein the rubber adhesive layer obtained in step (C) has a thickness of from 5 μm to 300 μm, and
wherein each of a hardness of the resin member (Ha), a hardness of the resin adhesive layer (Hb), a hardness of the rubber adhesive layer (Hc), and a hardness of the rubber member (Hd) obtained in step (C) is from 100 MPa to 600 MPa.

<9> The method of manufacturing a tire according to <8>, wherein the resin adhesive layer comprises a resorcinol-formalin-latex adhesive.

EXAMPLES

Hereinafter, the present invention is described more specifically by referring to synthetic examples. However, it should be noted that the invention is not limited to these examples.

<Preparation of Members and the Like>

As the resin member, two resin members, i.e., a resin member (1) and a resin member (2) were prepared.

(Resin Member)

A polyamide thermoplastic elastomer (XPA9048) from Ube Industries, Ltd. was used as a material for forming the resin member (1) ("resin member A" in Table 1), while a polyamide thermoplastic elastomer other than the material for forming the resin member (1) (Ube Industries, Ltd., XPA9063) was used as a material for forming the resin member (2) ("resin member B" in Table 1), thereby preparing tire cases. The hardness values of the resin members (Ha) were determined by the above-described method. The results are shown in Table 1 ("Hardness" in Table 1).

(Rubber Member)

The rubber composition used for the preparation of the rubber member was a rubber composition (1) obtained by kneading together the following composition (1) in a Banbury mixer ("NR-containing rubber" in Table 1), or a rubber composition (2) obtained by kneading together the following composition (2) in a Banbury mixer and then subjecting the mixture to a cross-linking treatment with an electron beam as described later ("Electron beam cross-linked rubber" in Table 1).

<Composition (1)>

Natural rubber: RSS #3 50 parts by mass

Styrene/butadiene copolymer rubber (SBR): #1500 (emulsion polymerization SBR), produced by JSR Corporation 50 parts by mass Carbon black: ISAF, produced by Asahi Carbon Co., Ltd. 50 parts by mass Anti-aging agent: ANTIGEN 6C, produced by Sumitomo Chemical Company, Limited. 1 part by mass Vulcanization accelerator: NOCCELER CZ, produced by Ouchi Shinko Chemical Industrial Co., Ltd. 0.5 parts by mass Vulcanization accelerator: NOCCELER DM, produced by Ouchi Shinko Chemical Industrial Co., Ltd. 1 part by mass Vulcanization accelerator: NOCCELER D, produced by Ouchi Shinko Chemical Industrial Co., Ltd. 0.5 parts by mass Sulfur: 1.5 parts by mass <Composition (2)>

Natural rubber: RSS #3. 50 parts by mass

Styrene/butadiene copolymer rubber (SBR): #1500 (emulsion polymerization SBR), produced by JSR Corporation. 50 parts by mass Carbon black: ISAF, produced by Asahi Carbon Co., Ltd. 10 parts by mass Silica: NIPSIL AQ, produced by Nippon Silica Co., Ltd. 40 parts by mass Anti-aging agent: ANTIGEN 6C, produced by Sumitomo Chemical Company, Limited. 1 part by mass Vulcanization accelerator: NOCCELER CZ, produced by Ouchi Shinko Chemical Industrial Co., Ltd. 0.5 parts by mass Vulcanization accelerator: NOCCELER DM, produced by Ouchi Shinko Chemical Industrial Co., Ltd. 1 part by mass Vulcanization accelerator: NOCCELER D, produced by Ouchi Shinko Chemical Industrial Co., Ltd. 0.5 parts by mass Sulfur 1.5 parts by mass The cross-linking treatment with an electron beam was performed as described below. Specifically, a sheet-shaped rubber composition was scanned and treated using an electron beam cross-linking apparatus under conditions of an acceleration voltage from 200 kV to 300 kV and a treatment time from 2 seconds to 10 seconds.

The rubber composition (1) and the rubber composition (2) were vulcanized (at 170° C. for 12 minutes) to obtain rubber members (rubber member (1) and rubber member (2)). The hardness (Hd) of the rubber members was determined by the method described above. The results are shown in Table 1 ("Hardness" in Table 1).

(Rubber Adhesive Layer)

As a material for forming the rubber adhesive layer, a rubber adhesive composition having the following composition was used. Specifically, a rubber adhesive composition (1) obtained by mixing the following composition (3) ("Rubber adhesive A" in Table 1), a rubber adhesive composition (2) obtained by mixing the following composition (4) ("Rubber adhesive B" in Table 1), a rubber adhesive composition (3) obtained by mixing the following composition (5) ("Rubber adhesive C" in Table 1), and a rubber adhesive composition (4) obtained by mixing the following composition (6) ("Rubber adhesive D" in Table 1) were used to form rubber adhesive layers (1) to (4), respectively.

<Composition (3)>

Natural rubber: RSS #3 100 parts by mass

Carbon black: SEAST 7HM, produced by Tokai Carbon Co., Ltd. 40 parts by mass

Phenol resin: KORESIN, produced by BASF SE 8 parts by mass

Stearic acid 2 parts by mass

Zinc oxide 3 parts by mass

Anti-aging agent: ANTIGEN 6C, produced by Sumitomo Chemical Company, Limited. 3 parts by mass Vulcanization accelerator: NOCCELER CZ, produced by Ouchi Shinko Chemical Industrial Co., Ltd. 0.8 parts by mass Sulfur 0.5 parts by mass Water 233.2 parts by mass The method for mixing the composition (3) was performed with reference to JP-A No. 2011-241363 to obtain the rubber adhesive composition (1) containing an aqueous cement.

<Composition (4)>

The rubber adhesive composition (2) was obtained in the same manner as the rubber adhesive composition (1) having the composition (3), except that the amount of sulfur added was changed to 1.5 parts by mass.

<Composition (5)>

The rubber adhesive composition (3) was obtained in the same manner as the rubber adhesive composition (2) having the composition (4), except that the amount of carbon black added was changed to 90 parts by mass.

<Composition (6)>

The rubber adhesive composition (4) was obtained in the same manner as the rubber adhesive composition (3) having the composition (5), except that the amount of sulfur added was changed to 2.5 parts by mass.

The rubber adhesive compositions (1) to (4) were vulcanized (at 170° C. for 12 minutes) to obtain rubber adhesive layers (rubber adhesive layers (1) to (4)). The hardness (Hc) of the rubber adhesive layers was determined by the method described above. The results are shown in Table 1 ("Hardness" in Table 1).

(Resin Adhesive Layer)

As a material for forming the resin adhesive layer, resin adhesive compositions (1) to (4) described below was used. Specifically, the resin adhesive composition (1) ("Composition A" in Table 1), the resin adhesive composition (2)

("Resin adhesive A" in Table 1), the resin adhesive composition (3) ("Resin adhesive B" in Table 1), and the resin adhesive composition (4) ("Composition B" in Table 1) were used to form resin adhesive layers (1) to (4).

<Resin Adhesive Composition (1)>

An RFL adhesive was prepared as described below. Nine grams of resorcinol, 12 g of formaldehyde (37% by mass solution, produced by Japan Formalin Company, Inc.), and 28 g of 4% by mass NaOH (0.1 mol/1) solution were added to 217 g of soft water and mixed. Then, the mixture was blended with a pre-mixture of 96 g of styrene-butadiene (SBR) latex [JSR 2108, produced by JSR Corporation (40% by mass latex)] and 93 g of vinylpyridine (VP) latex [PYRATEX (41% by mass latex)] and stirred for 1 hour to obtain a 20% by mass resorcinol-formalin-latex solution. This was used as an RFL adhesive (the resin adhesive composition (1)).

<Resin Adhesive Composition (2)>

As the resin adhesive composition (2) (resin adhesive A), a commercially available adhesive (CHEMLOK 6125, produced by Lord Corporation) was directly used.

<Resin Adhesive Composition (3)>

As the resin adhesive composition (3) (resin adhesive B), a commercially available adhesive (METALOC F112, produced by Toyokagaku Kenkyusho Co., Ltd.) was directly used.

<Resin Adhesive Composition (4)>

As the resin adhesive composition (4) (composition B), a composition was used, which was obtained by adding a commercially available crosslinking agent to a commercially available adhesive (METALOC F112, produced by Toyokagaku Kenkyusho Co., Ltd.) so that the physical properties described in Table 1 were obtained.

The resin adhesive compositions (1) to (4) were dried at 23° C. for 60 minutes and heated (at 170° C. for 12 minutes) to form resin adhesive layers (resin adhesive layers (1) to (4)). The hardness (Hb) of the resin adhesive layers was determined by the method described above. The results are shown in Table 1 ("Hardness" in Table 1).

Example 1

According to the first embodiment, a polyamide thermoplastic elastomer (XPA9063, produced by Ube Industries, Ltd.) is used as the specific resin to prepare a tire case as a resin member (2). Then, to the outside of the obtained tire case, the resin adhesive composition (3) is applied and dried at 23° C. for 60 minutes to form a resin adhesive layer. Thereafter, to the surface of the resin adhesive layer, the rubber adhesive composition (3) is further applied to form a rubber adhesive layer. Finally, the rubber composition (2) (tread) prepared using the composition (2) is attached, and the resultant is vulcanized (at 145° C. for 30 minutes) with a vulcanizer to prepare a tire having a tire size of 195/65 R15 and a layered structure shown in FIG. 2A. The thickness of the resin adhesive layer in the tire is 5 μm, while the thickness of the rubber adhesive layer is 10 μm.

A test piece of the resin member, a test piece of the resin adhesive layer, a test piece of the rubber adhesive layer, and a test piece of the rubber member are layered in this order by the same application method as the tire described above to obtain a dumbbell test piece A (JIS, No. 3) for evaluation of the tire durability.

Examples 2 to 4 and Comparative Examples 1 to 4

Tires are prepared in the same manner as in Example 1, except that the types of the members and layers in Example 1 are changed as described in Table 1.

In Comparative Example 3, no resin adhesive layer is formed, and the rubber adhesive layer is directly formed on the resin member. In Comparative Example 4, no rubber adhesive layer is formed, and the rubber member is directly disposed on the resin adhesive layer.

<Evaluation>

(Durability of Tire)

The tires prepared in Examples and Comparative Examples (size: 165/45 R16) are adjusted to have an internal pressure of 3.0 kg/cm² in a room at 25±2° C., and then leave to stand for 24 hours. After the air pressure is adjusted again, the tire is allowed to travel up to 20,000 km at a speed of 60 km/h on a drum with a diameter of 3 m while being applied with a load twice as large as the JIS load under an environment of 25±2° C. The distance traveled before the tire failure is measured, and evaluation is performed according to the following evaluation criteria. Longer distance travelled means better durability of the tire, and an A or a B rating is preferred in practical application.

A: Travels 3,000 km or more without any crack
B: Travels 3,000 km or more, but with some cracks at 3,000 km
C: Does not travel more than 1,000 km The presence or absence of cracks is evaluated by visually observing the tire surface and a cross section of the tire in the tread width direction after travelling.

(Workability in Tire Manufacturing)

The workability in tire manufacturing is evaluated by the amount of residual interlayer air when a tread is attached to the tire case (the percentage (%) of the area of the bubble generated portion in the interface between the tread rubber and the tire case with respect to the total area of the interface between the tread rubber and the tire case, after vulcanization) according to the following evaluation criteria. When the evaluation rating of the workability in tire manufacturing is A or B, the tire is evaluated as having an excellent manufacturability.

A: the percentage of the area of the bubble generated portion is from 0% to less than 5%
B: the percentage of the area of the bubble generated portion is from 5% to less than 10%
C: the percentage of the area of the bubble generated portion is from 10% to less than 15%

The layered structures and their evaluation results in the above Examples and Comparative Examples are shown in Table 1.

TABLE 1

| | Material | Member or Layer | Hardness (MPa) | Example 1 | Example 2 | Example 3 | Example 4 |
|---|---|---|---|---|---|---|---|
| Resin member | Resin member A | Resin member (1) | 125 | | | | ○ |
| | Resin member B | Resin member (2) | 200 | ○ | ○ | ○ | |

TABLE 1-continued

|  | Material | Member or Layer | Hardness (MPa) | | | | |
|---|---|---|---|---|---|---|---|
| Resin adhesive layer | Composition A | Resin adhesive layer (1) | 50 | | | | |
|  | Resin adhesive A | Resin adhesive layer (2) | 140 | | ○ | ○ | ○ |
|  | Resin adhesive B | Resin adhesive layer (3) | 400 | ○ | | | |
|  | Composition B | Resin adhesive layer (4) | 600 | | | | |
| Rubber adhesive layer | Rubber adhesive A | Rubber adhesive layer (1) | 50 | | | | |
|  | Rubber adhesive B | Rubber adhesive layer (2) | 150 | | ○ | ○ | ○ |
|  | Rubber adhesive C | Rubber adhesive layer (3) | 400 | ○ | | | |
|  | Rubber adhesive D | Rubber adhesive layer (4) | 600 | | | | |
| Rubber member | NR-containing rubber | Rubber member (1) | 100 | | ○ | | |
|  | Electron beam cross-linked rubber | Rubber member (2) | 530 | ○ | | ○ | ○ |
| Evaluation results | Difference in hardness between the hardest layer and the softest layer (MPa) | | | 330 | 100 | 390 | 405 |
|  | Workability during tire manufacturing (manufacturability) | | | B | A | A | A |
|  | Tire durability | | | A | A | B | B |

|  | Material | Member or Layer | Hardness (MPa) | Comparative Example 1 | Comparative Example 2 | Comparative Example 3 | Comparative Example 4 |
|---|---|---|---|---|---|---|---|
| Resin member | Resin member A | Resin member (1) | 125 | | ○ | | |
|  | Resin member B | Resin member (2) | 200 | ○ | | ○ | ○ |
| Resin adhesive layer | Composition A | Resin adhesive layer (1) | 50 | | ○ | — | |
|  | Resin adhesive A | Resin adhesive layer (2) | 140 | | | — | ○ |
|  | Resin adhesive B | Resin adhesive layer (3) | 400 | | | — | |
|  | Composition B | Resin adhesive layer (4) | 600 | ○ | | — | |
| Rubber adhesive layer | Rubber adhesive A | Rubber adhesive layer (1) | 50 | | ○ | | — |
|  | Rubber adhesive B | Rubber adhesive layer (2) | 150 | | | ○ | — |
|  | Rubber adhesive C | Rubber adhesive layer (3) | 400 | | | | — |
|  | Rubber adhesive D | Rubber adhesive layer (4) | 600 | ○ | | | — |
| Rubber member | NR-containing rubber | Rubber member (1) | 100 | | ○ | ○ | ○ |
|  | Electron beam cross-linked rubber | Rubber member (2) | 530 | ○ | | | |
| Evaluation results | Difference in hardness between the hardest layer and the softest layer (MPa) | | | 400 | 75 | 100 | 100 |
|  | Workability during tire manufacturing (manufacturability) | | | B | A | A | C |
|  | Tire durability | | | C | C | C | A |

As can be seen from the results, the workability in tire manufacturing, i.e., the ease of attaching a tread, is improved and the tire durability is better in Examples as compared to Comparative Examples. Particularly in Example 2, where the difference in hardness between the hardest layer and the softest layer is 100 MPa, the tire shows a further improved tire durability. However, in Comparative Examples, the tire durability and the workability in tire manufacturing are not able to be improved concurrently.

Thus, the tires in Examples are demonstrated to be excellent in both the tire durability and the workability in tire manufacturing.

All documents, and technical standards described in the present specification are incorporated herein by reference to the same extent as if each individual document, and technical standard were specifically and individually indicated to be incorporated by reference.

The invention claimed is:

1. A tire having a layered structure, comprising:
   a resin member comprising at least one resin selected from the group consisting of a polyamide resin, a polyamide thermoplastic elastomer, a polyester resin, and a polyester thermoplastic elastomer;
   a resin adhesive layer disposed on the resin member;
   a rubber adhesive layer that is adhered to a side of the resin adhesive layer that is opposite from a side of the resin adhesive layer on which the resin member is disposed and that has a thickness of from 5 μm to 300 μm; and
   a rubber member disposed on a side of the rubber adhesive layer that is opposite from a side of the rubber adhesive layer on which the resin adhesive layer is disposed, wherein the tire is vulcanized, and wherein each of a hardness of the resin member (Ha), a hardness of the resin adhesive layer (Hb), a hardness of the rubber adhesive layer (Hc), and a hardness of the rubber member (Hd) is from 100 MPa to 600 MPa.

2. The tire according to claim 1, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2:

$$Ha<Hb\leq Hc<Hd \qquad \text{Formula 1}$$

$$Ha>Hb\geq Hc>Hd. \qquad \text{Formula 2}$$

3. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 350 MPa or less.

4. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 200 MPa or less.

5. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 100 MPa or less.

6. The tire according to claim 1, wherein the resin adhesive layer comprises a resorcinol-formalin-latex adhesive.

7. The tire according to claim 1, wherein the resin adhesive layer has a thickness of from 0.5 μm to 30 μm.

8. The tire according to claim 1, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2, and wherein a difference between a largest value and a smallest value among the hardness of the resin member (Ha), the hardness of the resin adhesive layer (Hb), the hardness of the rubber adhesive layer (Hc), and the hardness of the rubber member (Hd) is 350 MPa or less:

$$Ha<Hb\leq Hc<Hd \qquad \text{Formula 1}$$

$$Ha>Hb\geq Hc>Hd. \qquad \text{Formula 2}$$

9. The tire according to claim 1, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2, and wherein a difference between a largest value and a smallest value among the hardness of the resin member (Ha), the hardness of the resin adhesive layer (Hb), the hardness of the rubber adhesive layer (Hc), and the hardness of the rubber member (Hd) is 200 MPa or less:

$$Ha<Hb\leq Hc<Hd \qquad \text{Formula 1}$$

$$Ha>Hb\geq Hc>Hd. \qquad \text{Formula 2}$$

10. The tire according to claim 1, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2, and wherein a difference between a largest value and a smallest value among the hardness of the resin member (Ha), the hardness of the resin adhesive layer (Hb), the hardness of the rubber adhesive layer (Hc), and the hardness of the rubber member (Hd) is 100 MPa or less:

$$Ha<Hb\leq Hc<Hd \qquad \text{Formula 1}$$

$$Ha>Hb\geq Hc>Hd. \qquad \text{Formula 2}$$

11. The tire according to claim 1, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2, and wherein the resin adhesive layer comprises a resorcinol-formalin-latex adhesive:

$$Ha<Hb\leq Hc<Hd \qquad \text{Formula 1}$$

$$Ha>Hb\geq Hc>Hd. \qquad \text{Formula 2}$$

12. The tire according to claim 1, wherein the hardness of the resin member (Ha), the hardness of the resin adhesive layer (Hb), the hardness of the rubber adhesive layer (Hc), and the hardness of the rubber member (Hd) satisfy the following Formula 1 or Formula 2, and wherein the resin adhesive layer has a thickness of from 0.5 μm to 30 μm $$Ha<Hb\leq Hc<Hd \qquad \text{Formula 1}$$

$$Ha>Hb\geq Hc>Hd. \qquad \text{Formula 2}$$

13. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 350 MPa or less, and wherein the resin adhesive layer comprises a resorcinol-formalin-latex adhesive.

14. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 350 MPa or less, and wherein the resin adhesive layer has a thickness of from 0.5 μm to 30 μm.

15. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 200 MPa or less, and wherein the resin adhesive layer comprises a resorcinol-formalin-latex adhesive.

16. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 200 MPa or less, and wherein the resin adhesive layer has a thickness of from 0.5 μm to 30 μm.

17. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 100 MPa or less, and wherein the resin adhesive layer comprises a resorcinol-formalin-latex adhesive.

18. The tire according to claim 1, wherein a difference between a largest value and a smallest value among the hardness of the resin member (Ha), the hardness of the resin adhesive layer (Hb), the hardness of the rubber adhesive layer (Hc), and the hardness of the rubber member (Hd) is 100 MPa or less, and wherein the resin adhesive layer has a thickness of from 0.5 μm to 30 μm.

19. A method of manufacturing a tire, comprising steps of:
(A) forming a resin member using at least one resin selected from the group consisting of a polyamide resin, a polyamide thermoplastic elastomer, a polyester resin, and a polyester thermoplastic elastomer;
(B) obtaining a layered body by layering, on the resin member formed in step (A):
a resin adhesive layer disposed by applying a resin adhesive composition;
a rubber adhesive layer that is adhered to and disposed on a surface of the resin adhesive layer, by applying a rubber adhesive composition to a side of the resin adhesive layer that is opposite from a side of the resin adhesive layer on which the resin member is disposed; and
a rubber member disposed on a side of the rubber adhesive layer that is opposite from a side of the rubber adhesive layer on which the resin adhesive layer is disposed; and
(C) vulcanizing the layered body after step (B),
wherein the rubber adhesive layer obtained in step (C) has a thickness of from 5 μm to 300 μm, and
wherein each of a hardness of the resin member (Ha), a hardness of the resin adhesive layer (Hb), a hardness of the rubber adhesive layer (Hc), and a hardness of the rubber member (Hd) obtained in step (C) is from 100 MPa to 600 MPa.

20. The method of manufacturing a tire according to claim 19, wherein the resin adhesive layer comprises a resorcinol-formalin-latex adhesive.

* * * * *